United States Patent

[19] Hammer

[11] Patent Number: 6,161,457
[45] Date of Patent: Dec. 19, 2000

[54] MACHINE TOOL

[75] Inventor: Eberhard Hammer, Hardt, Germany

[73] Assignee: J.G. Weisser Söhne Werkzeugmaschinenfabrik GmbH & Co. KG, St. Georgen, Germany

[21] Appl. No.: 09/238,089

[22] Filed: Jan. 26, 1999

[30] Foreign Application Priority Data

Jan. 30, 1998 [DE] Germany .......................... 198 03 563

[51] Int. Cl.[7] .................................................. B23B 3/06
[52] U.S. Cl. ............................... 82/121; 82/122; 82/129; 82/132
[58] Field of Search ............................. 82/117, 132, 118, 82/120, 123, 121, 129, 154, 122; 409/165–167, 202, 212; 483/14

[56] References Cited

U.S. PATENT DOCUMENTS

| | | | |
|---|---|---|---|
| 3,559,530 | 2/1971 | Wagner et al. | 90/14 |
| 3,990,133 | 11/1976 | Schalles et al. | 29/27 C |
| 4,080,853 | 3/1978 | Goto | 82/2 R |
| 4,159,660 | 7/1979 | Buckley et al. | 82/3 |
| 4,182,205 | 1/1980 | Baker | 82/3 |
| 4,317,394 | 3/1982 | Link et al. | 82/2.5 |
| 4,343,206 | 8/1982 | Douglass | 82/2 R |
| 4,742,739 | 5/1988 | Yamaguchi et al. | 82/2 D |
| 4,809,422 | 3/1989 | Kitamura | 29/568 |
| 4,813,315 | 3/1989 | Takahashi | 82/142 |
| 4,987,668 | 1/1991 | Roesch | 29/568 |
| 5,025,690 | 6/1991 | Myers | 82/121 |
| 5,078,556 | 1/1992 | Schrod et al. | 409/132 |
| 5,081,889 | 1/1992 | Takano et al. | 82/122 |
| 5,314,397 | 5/1994 | Mills et al. | 483/30 |
| 5,429,020 | 7/1995 | Hack et al. | 82/117 |
| 5,436,845 | 7/1995 | Takahashi | 82/118 |
| 5,439,431 | 8/1995 | Hessbruggen et al. | 483/14 |
| 5,688,084 | 11/1997 | Fritz et al. | 409/202 |
| 5,704,262 | 1/1998 | Baumbusch et al. | 82/129 |
| 5,782,151 | 7/1998 | Shiramasa | 82/124 |

FOREIGN PATENT DOCUMENTS

| | | |
|---|---|---|
| 3416660 C2 | 5/1984 | Germany . |
| 3732559 C2 | 9/1987 | Germany . |
| 3732559 | 6/1995 | Germany . |
| 19651474 A1 | 12/1996 | Germany . |

Primary Examiner—A. L. Wellington
Assistant Examiner—Erica Ergenbright
Attorney, Agent, or Firm—Foley, Hoag & Eliot LLP

[57] ABSTRACT

A machine tool, such a lathe, is described that includes a machine base and four base columns supporting a horizontal roof-shaped upper section. Horizontally guided Y-carriages and Z-carriages are suspended from an underside of the upper section. A horizontal working spindle is suspended from the Z-carriages. An X-carriage is arranged and vertically guided on the lower section of the machine stand.

20 Claims, 21 Drawing Sheets

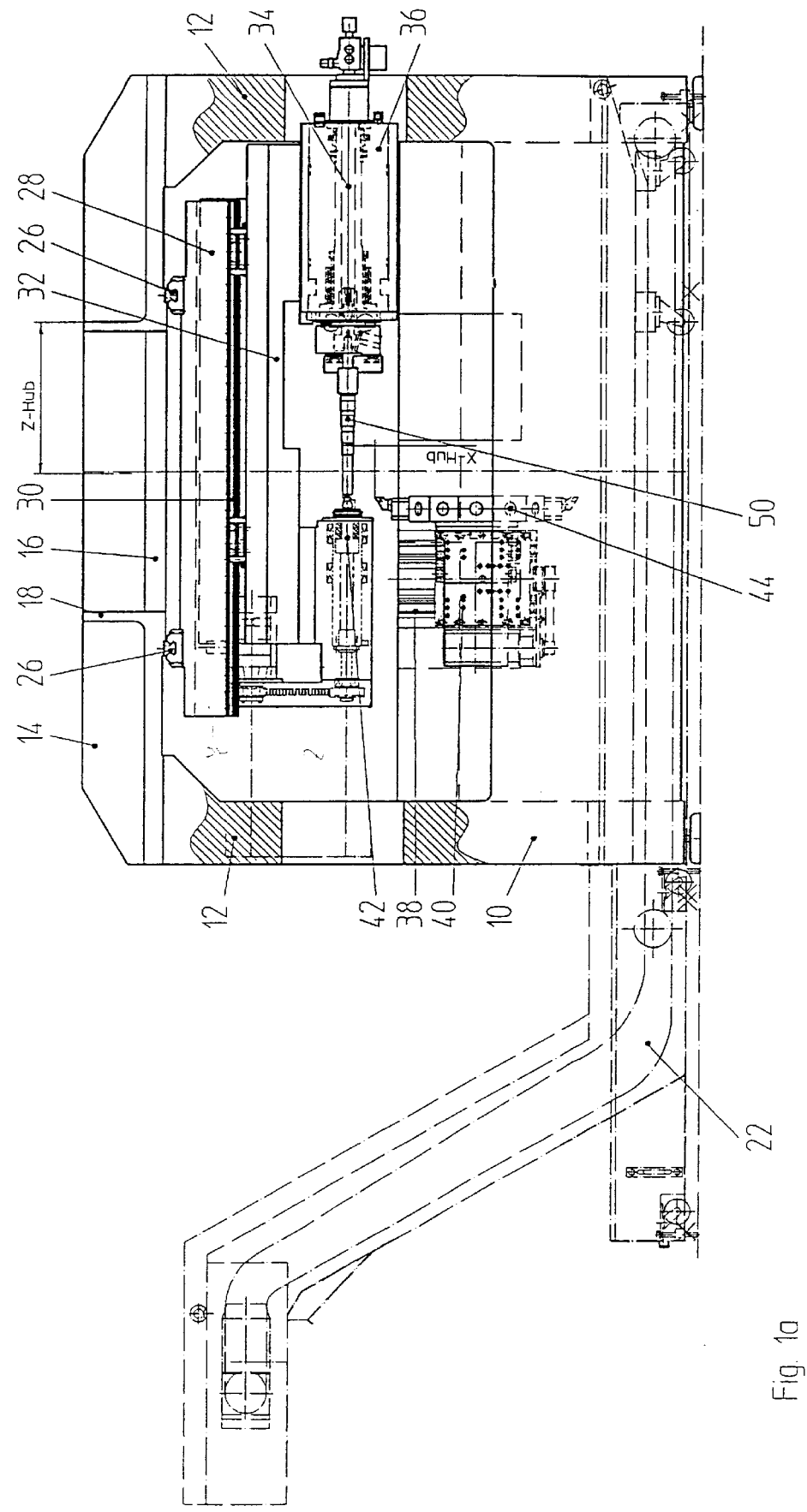

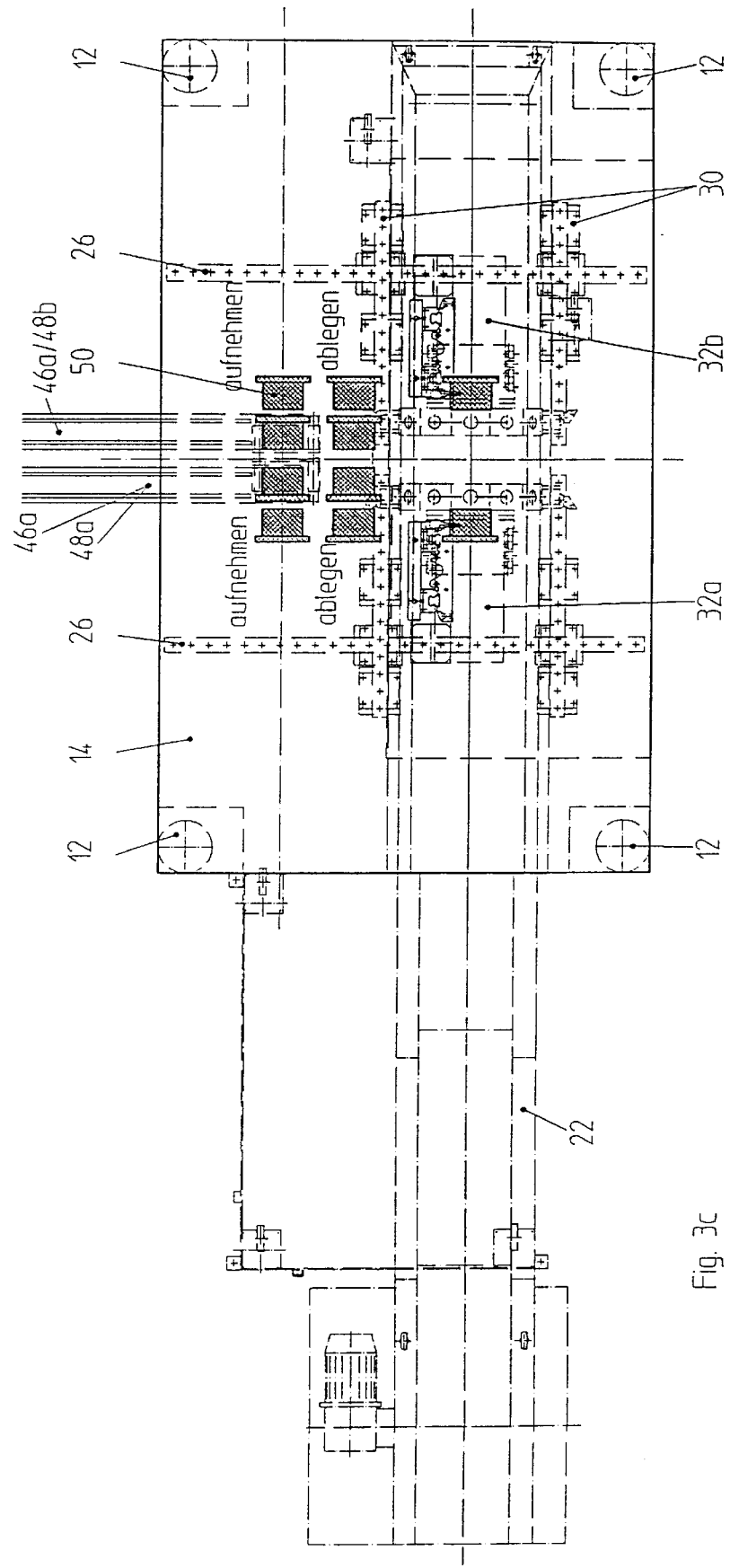

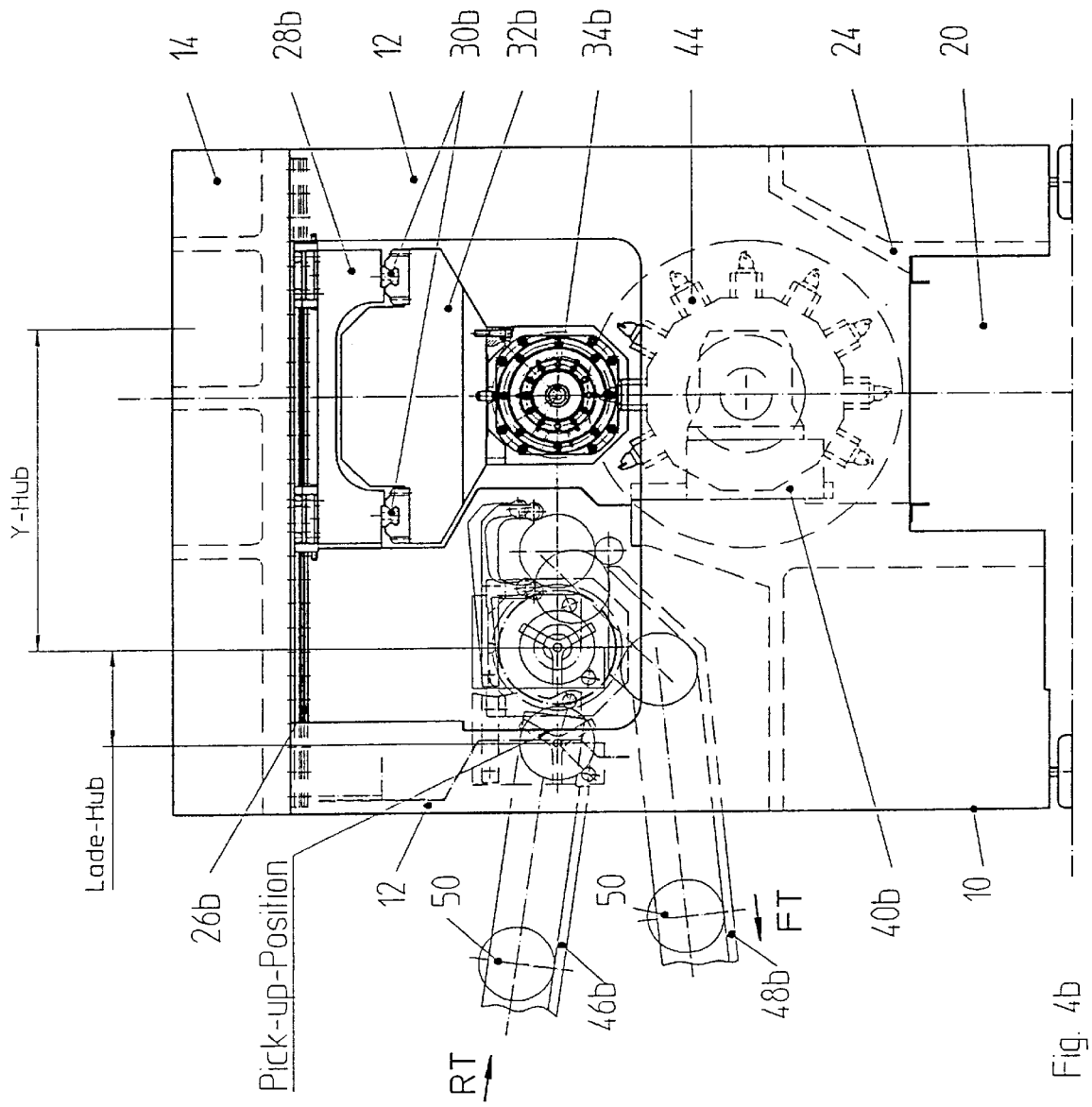

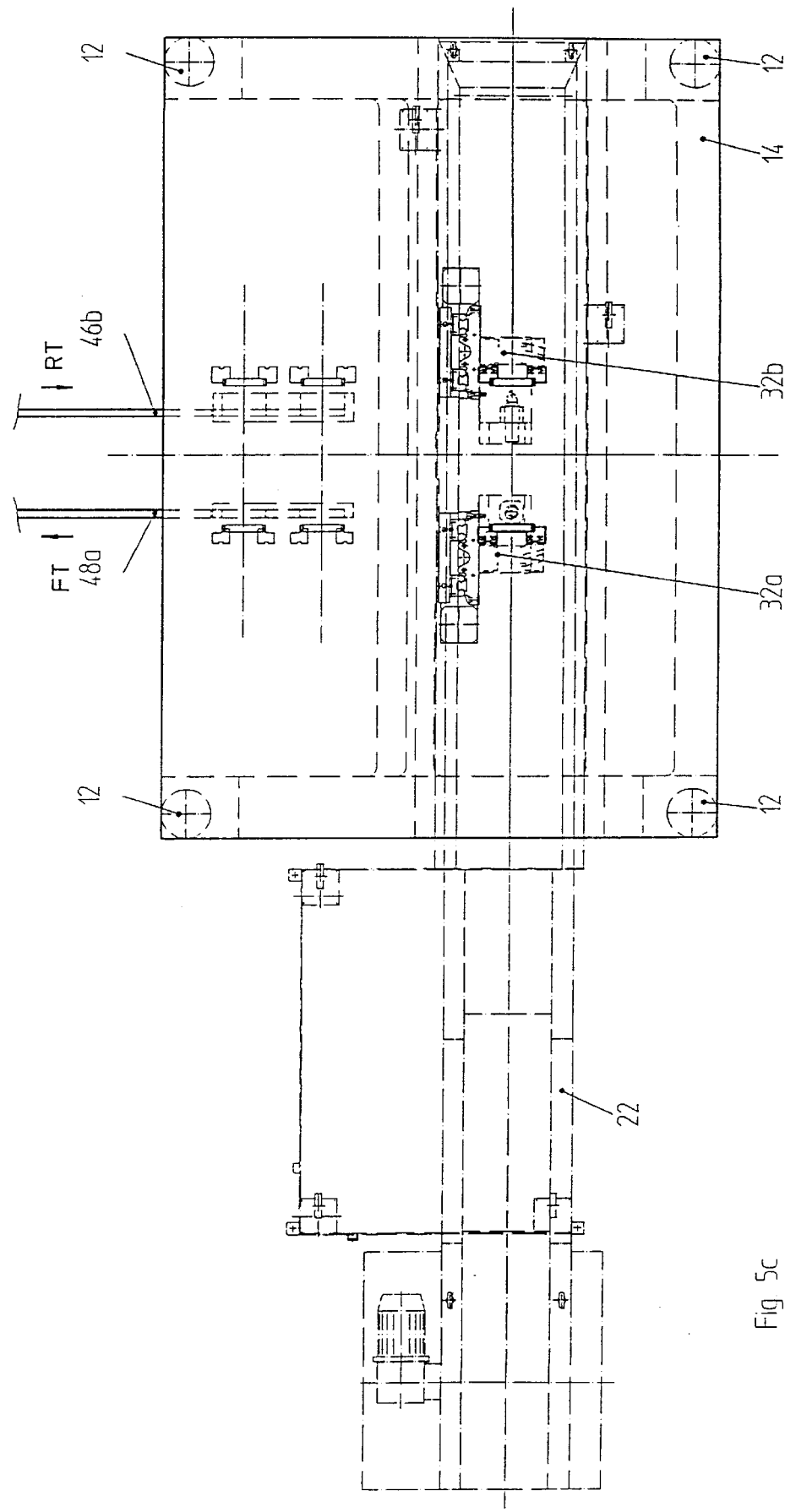

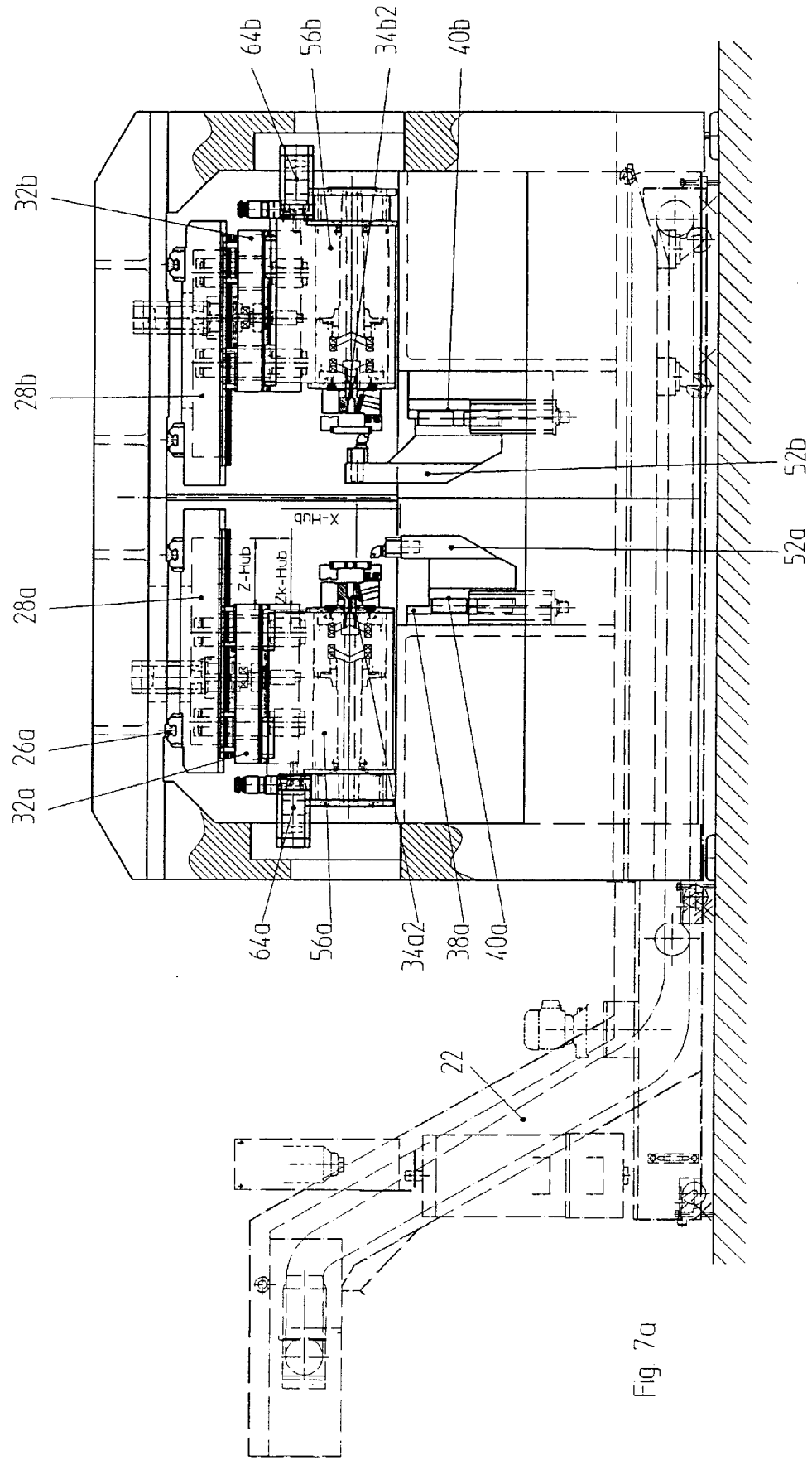

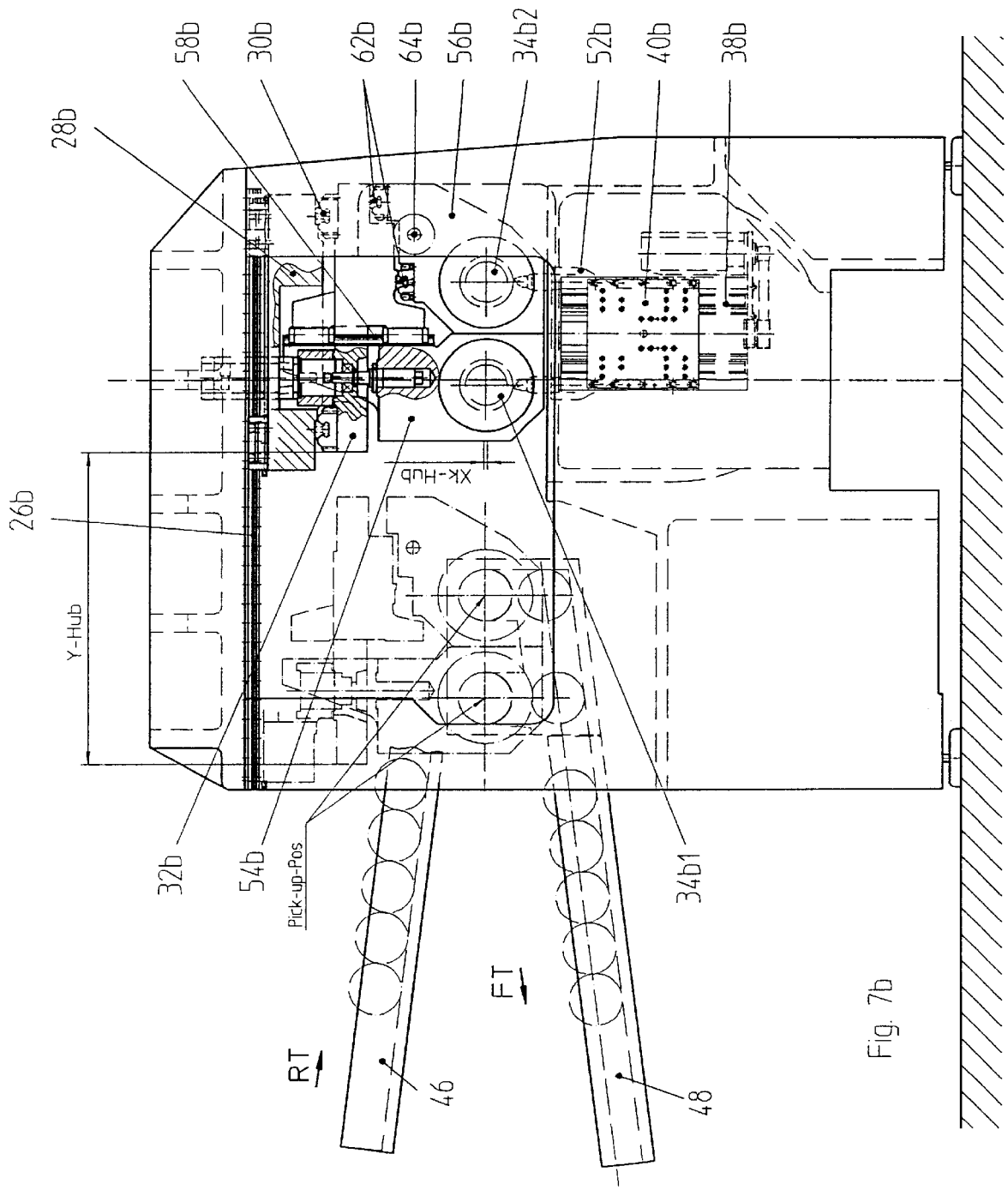

MACHINE TOOL

BACKGROUND OF THE INVENTION

1. Field of the Invention

This invention relates to the field of machine tools, and more particularly to the field of machine tools such as a lathe.

2. Description of Related Art

DE 34 16 660 C2 describes a lathe wherein the work spindle is located vertically and guided in the vertical Z-direction on an X-carriage. The X-carriage can move in the horizontal direction. The tools are located beneath the hanging work spindle. The X-guides are mounted on the vertical end wall of a machine base. The work spindle can be moved between a loading and unloading station and the machining station by horizontal movement in the X-direction and vertical movement in the Z-direction so that the workpieces are picked up by the work spindle itself in the loading and unloading station and can be released there as well (so-called pick-up principle). The mounting of the X-guide on the vertical end wall of the machine base limits the freedom of this machine tool concept relative to the Y-axis.

DE 196 51 474 A1 describes a machine tool with similar features, except that the work spindle is mounted with a horizontal axis on the carriage that can move in the vertical direction. The X-guides are also mounted on vertical end walls of the machine base so that corresponding limitations result.

It is therefore desirable to provide a machine tool that combines considerable freedom in the three axes of movement with a high degree of flexibility in adaptation to various machining tasks.

SUMMARY OF THE INVENTION

In a general aspect of the invention, the machine tool includes a machine base with a horizontal upper section that is supported by four base columns, with the Y-carriage and the Z-carriage suspended from the underside of the upper section. A work spindle is mounted horizontally and suspended from the Z-carriage. The X-axis is completely independent of the Y-axis and the Z-axis and is provided by an X-carriage guided on the machine base.

The suspended arrangement of the Y- and Z-carriages on the underside of the roof-shaped upper section, which is supported only at the four columns by the base columns makes it possible for the machine tool to be made open on all four sides. As a result, the work spindle can move freely in the horizontal Z- and Y-directions. Travel in these horizontal directions is not limited by any sections of the machine base. In particular it is also possible to move the work spindle up to the outer edge of the upper section, and parts of the spindle head can also project through the open sides beyond the outer contour of the machine base. Even with considerable horizontal travel distances in the Y-direction and the Z-direction, a compact space-saving design for the machine base and hence for the entire machine tool is possible.

The possibility provided by the suspended arrangement of the Y-axis and the Z-axis on the upper section for designing the machine tool to be open on all four side surfaces also provides considerable flexibility in designing the machine tool and in adapting it to various machining tasks. In particular, the workpiece feed and removal can be designed with considerable design freedom. The accessibility of the workspace for operators can also be designed with correspondingly large degrees of freedom.

The machine tool concept allows a versatile variable design for the machine tool in a modular system. Various machine assemblies can be combined and integrated in the machine tool concept. The horizontal work spindle allows it to be designed as a horizontal lathe for a wide variety of turning tasks including complete machining of a workpiece. The horizontal work spindle can also be designed as a grinding spindle or drilling spindle. For turning, it is also possible to mount tailstocks and possibly steadies on the Z-carriage if needed.

The Y-movement can be performed, thanks to the possible travel, preferably at high speed to reach a lateral loading and unloading zone, so that in a pick-up system, the workpieces can be transported into the working position and can be released after they are machined. This saves costly loading devices.

If the Y-travel is used only for the loading and unloading process, a simple hydraulic drive with end-position positioning suffices for Y-feed. However the Y-axis can also be designed as an NC-axis so that in conjunction with the NC-controlled Z-axis and X-axis, versatile complete machining is possible in nearly all chip-removal techniques.

The symmetrical arrangement of the carriage guides of the Y-axis and the Z-axis on the upper section and the symmetrical support of this upper section produce a high degree of system rigidity and hence a high machining precision.

As a result of the separate arrangement of the X-carriage below on the machine base, the latter does not adversely affect the accessibility and variability as well as the compact design of the machine tool. The suspended arrangement of the Y-carriage, Z-carriage, and work spindle allows chips to fall freely downward, permitting simple and reliable sealing for the X-carriage.

The design of the machine tool can be adapted flexibly to a wide variety of machine tasks. The machine tool can be equipped with one or more work spindles. If several work spindles are provided, workpieces chucked to the work spindles can be machined identically and simultaneously. It is also possible to transfer the workpieces from one work spindle to the next and to perform different machining processes on the individual work spindles. If several work spindles are provided, they can be mounted on a common Y-carriage or they can have separate Y-carriages. The number of X-carriages can vary as well. In the simplest case, only one X-carriage is provided. However, if the machine tool has two or more work spindles, at least two X-carriages are also preferably provided in order to be able to machine the workpieces simultaneously when they are chucked to the work spindles. If the work spindles are located opposite one another, this results in a particularly simple transfer possibility for the workpiece from chucking in one work spindle to chucking in the other work spindle. In addition, two work spindles can be mounted parallel side by side in a common Y-carriage in order to machine two workpieces in parallel in an identical fashion or to machine the two workpieces in succession using the same tool. If two workpieces are machined in parallel with two work spindles located side by side, a common Z-carriage can perform the Z-travel for the two work spindles and the common X-carriage can produce the X-travel for both tools. In order to be able to prevent differences in machining, for example as a consequence of different degrees of tool wear or the like, in this case however it is preferable to provide Z-correction travel and X-correction travel in order to be able to compensate for the differences in working travel for the tools that are machined in parallel.

The diverse possibilities for design and the considerable degree of freedom in accessibility allow simple handling of the workpieces, which is also especially suitable for automation of the work processes.

The invention will now be described in greater detail with reference to the embodiments shown in the drawing.

BRIEF DESCRIPTION OF DRAWINGS

FIG. 1a shows a first embodiment of the machine tool in a front view;

FIG. 3c shows the third embodiment of the machine tool in a top view;

FIG. 4b shows the fourth embodiment of the machine tool in a side view;

FIG. 5c shows the fifth embodiment of the machine tool in a top view;

FIG. 7a shows a seventh embodiment of the machine tool in a front view;

FIG. 7b shows the seventh embodiment of the machine tool in a side view; and

DETAILED DESCRIPTION OF THE PREFERRED EMBODIMENT(S)

Figure 1B:
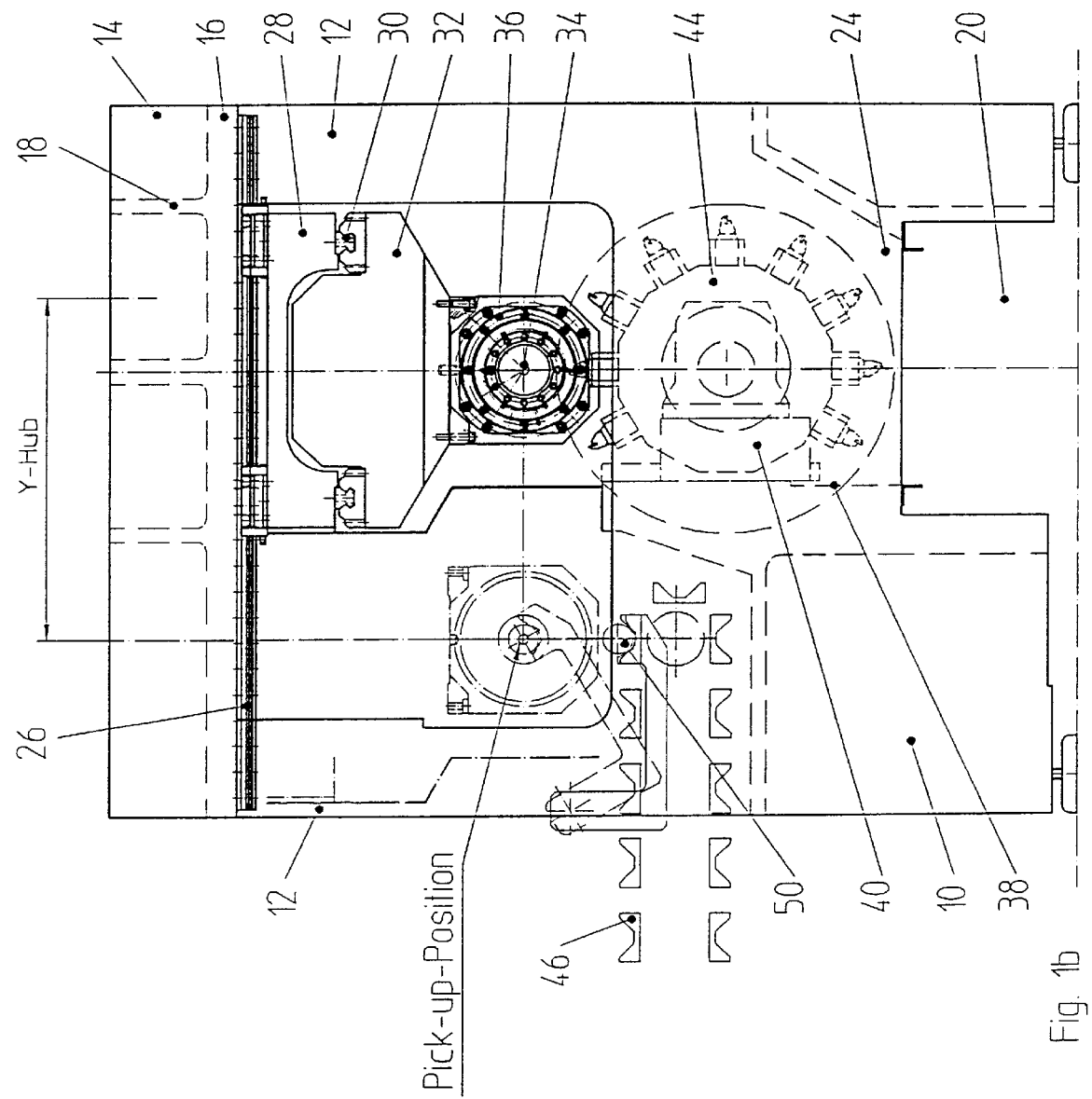
FIG. 1b shows the first embodiment of the machine tool in a side view.

The machine tool has a cast machine base made of cast iron or polymer concrete for example. The machine base consists of an essentially parallelipipedic bottom part 10 of the base, with vertical base columns 12 cast on its four corners. On the top of the base columns 12 is a base upper section 14 that is bolted to the base columns 12. The upper section 14 of the base covers the entire surface of the machine base like a roof. The underside of upper section 14 of the base is designed as a horizontal flat plate 16 on whose upper side reinforcing ribs 18 are formed. Since upper section 14 of the base is supported only at the four corners by base columns 12, the interior of the machine is freely accessible from all four sides between the underneath part 10 of the base and the upper section 14 of the base.

The upper section 10 of the base has a tunnel 20 that is continuous and runs in the lengthwise direction on the bottom, into which tunnel a chip conveyor 22 can be inserted. In the middle area of the machine base that serves as the working chamber, a chip shaft 24 is formed in the lower section 10 of the base, said shaft terminating vertically at the bottom in the tunnel 20 to allow the chips to fall freely.

Horizontal Y-guides 26 are mounted on the underside of the upper section 14 of the base, with Y-carriages 28 being suspended from these guides so that they can move. Z-guides 30 that run horizontally are attached to the underside of Y-carriages 28, said guides running at right angles to Y-guides 26. Z-carriages 32 are hung from Z-guides 30 so that they can move, said Z-carriages supporting a horizontal work spindle 34 with its drive motor 36.

Vertical X-guides 38 are located in lower section 10 of the base, on which guides X-carriages 40 can travel vertically.

This general machine tool concept can be combined flexibly in a wide variety of ways in a modular system with machine assemblies that are known of themselves. As a result, machine tools for a wide variety of machining tasks can be produced with a uniform machine base and machine concept. Several examples will be described and explained below.

FIGS. 1a, b, c show one embodiment of the machine tool for turning workpieces in the shape of shafts.

On the underside of the upper section 14 of the base, a Y-guide 26 is mounted that extends over the entire width and consists of two profile rails. A Y-carriage 28 is suspended from Y-guide 26 by means of roller bearings, and supports on its underside a Z-guide 30 that runs at 90° to Y-guide 26, said guide 30 consisting of two parallel profile rails. A Z-carriage 32 is movably mounted on Z-guide 30, with the length of said carriage essentially corresponding to the width of Y-carriage 28. A horizontal work spindle 34 with a drive motor 36 is suspended from the bottom of Z-carriage 32 at one end. At the opposite end of Z-carriage 32, a tailstock 42 is mounted whose axis is flush with the axis of work spindle 34.

An X-carriage 40 is mounted in a vertically movable fashion in an X-guide 38 on lower section 10 of the base, said carriage 40 carrying a tool turret 44 with a horizontal revolving axis. Tool turret 44 has turning tools on its circumference.

Figure 1C:
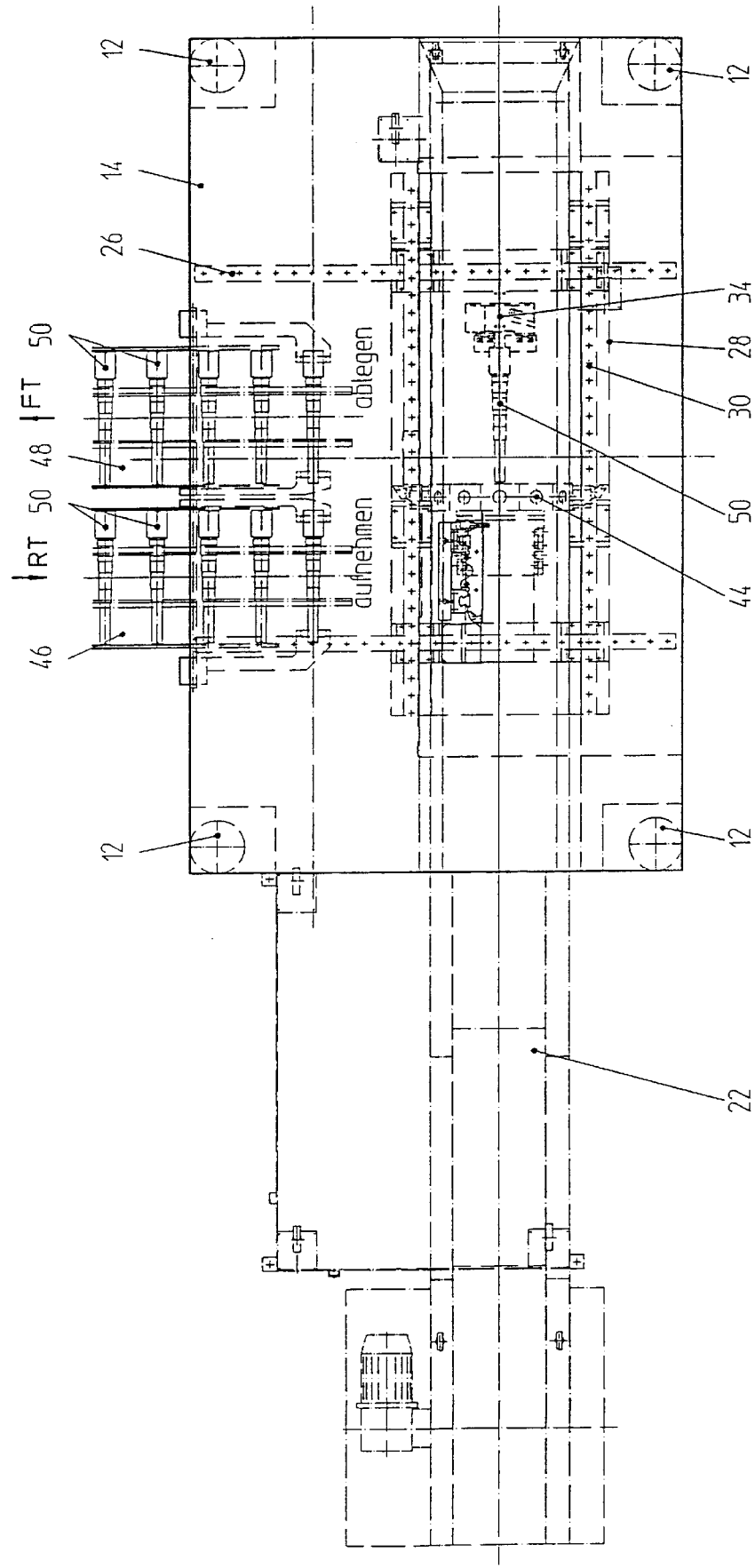
FIG. 1c shows the first embodiment of the machine tool in a top view.

Behind the working chamber beneath which chip shaft 24 is located and in which tool turret 44 is located, a loading and unloading station is provided in the machine base. Two conveyor belts 46 and 48 run into the loading and unloading station through the open rear of the machine base. Conveyor belts 46 and 48 run horizontally at right angles to the axis of work spindle 34 and are offset with respect to one another in parallel in the direction of this axis. The machine tool in FIG. 1 operates as follows:

Rough workpieces are supplied in the receiving v-blocks of conveyor belt 46 of the machine tool. Z-carriage 32 is moved in the Z-direction by an NC-controlled drive so that work spindle 34 and tailstock 42 reach the Z-position that corresponds to conveyor belt 46. Y-carriage 28 is moved by a hydraulic drive for the distance in the Y direction characterized in FIG. 1b so that work spindle 34 and tailstock 42 reach the loading position above conveyor belt 46. A rough workpiece is picked up a lifting device from conveyor belt 46 and raised between work spindle 34 and tailstock 42. After chucking the blank between work spindle 34 and tailstock 42, Y-carriage 28 moves back into the working position. Drive motor 36 drives work spindle 34 and workpiece 50, and the workpiece is machined by the turning tool of tool turret 44, with the Z-feed being provided by an NC-control of Z-carriage 32 and the X-feed being provided by NC-control of Y-carriage 40. As soon as workpiece 50 has been completely machined, the Z-carriage 32 is moved into the Z-position of the second conveyor belt 48. Y-carriage 28 performs the Y-travel shown in FIG. 1b so that workpiece 50 moves into the unloading position above conveyor belt 48. Workpiece 50 can be laid down on conveyor belt 48 and carried away.

The feed of workpieces 50 by conveyor belt 46 and the carrying away of workpieces 50 by conveyor belt 48 take place from the rear of the machine base. The operator has free access from the opposite front of the machine base and a clear view of the working chamber. The supply lines for driving the carriages and the work spindle as well as for coolants and lubricants etc. can be fed through the open right and left sides. The entire bottom surface of the machine base can be utilized for Y-travel and Z-travel, so that a compact machine design is obtained with a favorable ratio between the space requirements and the travel distances. The width of the machine base can be utilized for the Y-travel so that the loading and unloading station and the working chamber can be optimally integrated into the machine base. As FIG. 1 a shows, the full length of the machine base can be used for Z-travel. This is because when the Z-carriage moves into the right-hand end position shown in FIG. 1a, drive motor 36 can move out through the open side of the machine base.

Figure 2A:
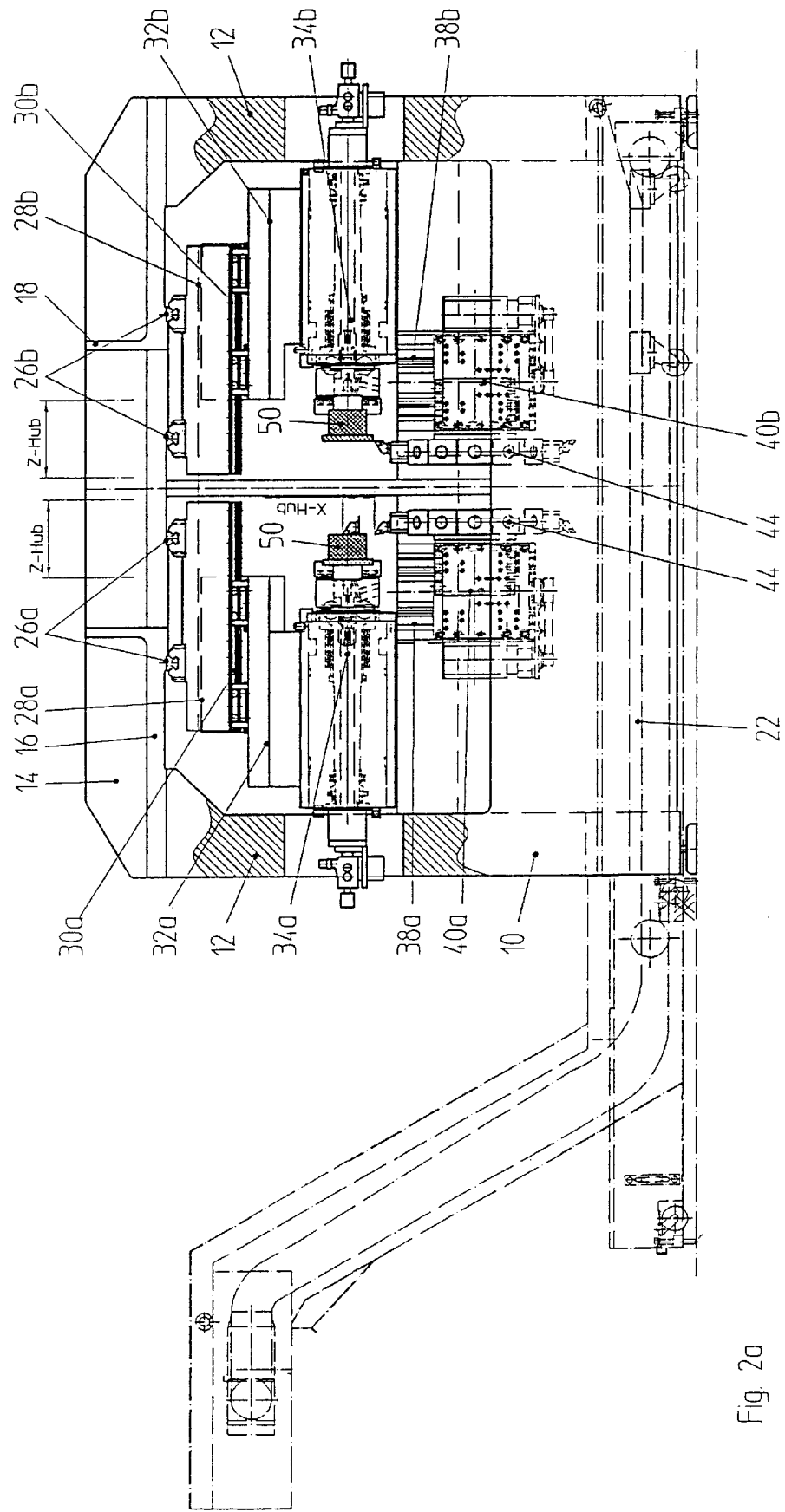
FIG. 2a shows a second embodiment of the machine tool in a front view.

FIGS. 2a, b, c show a embodiment of the machine tool for turning short flange-shaped workpieces 50 in two chuckings.

To the extent that this corresponds to the previous description, reference will be made to the latter.

Figure 2B:
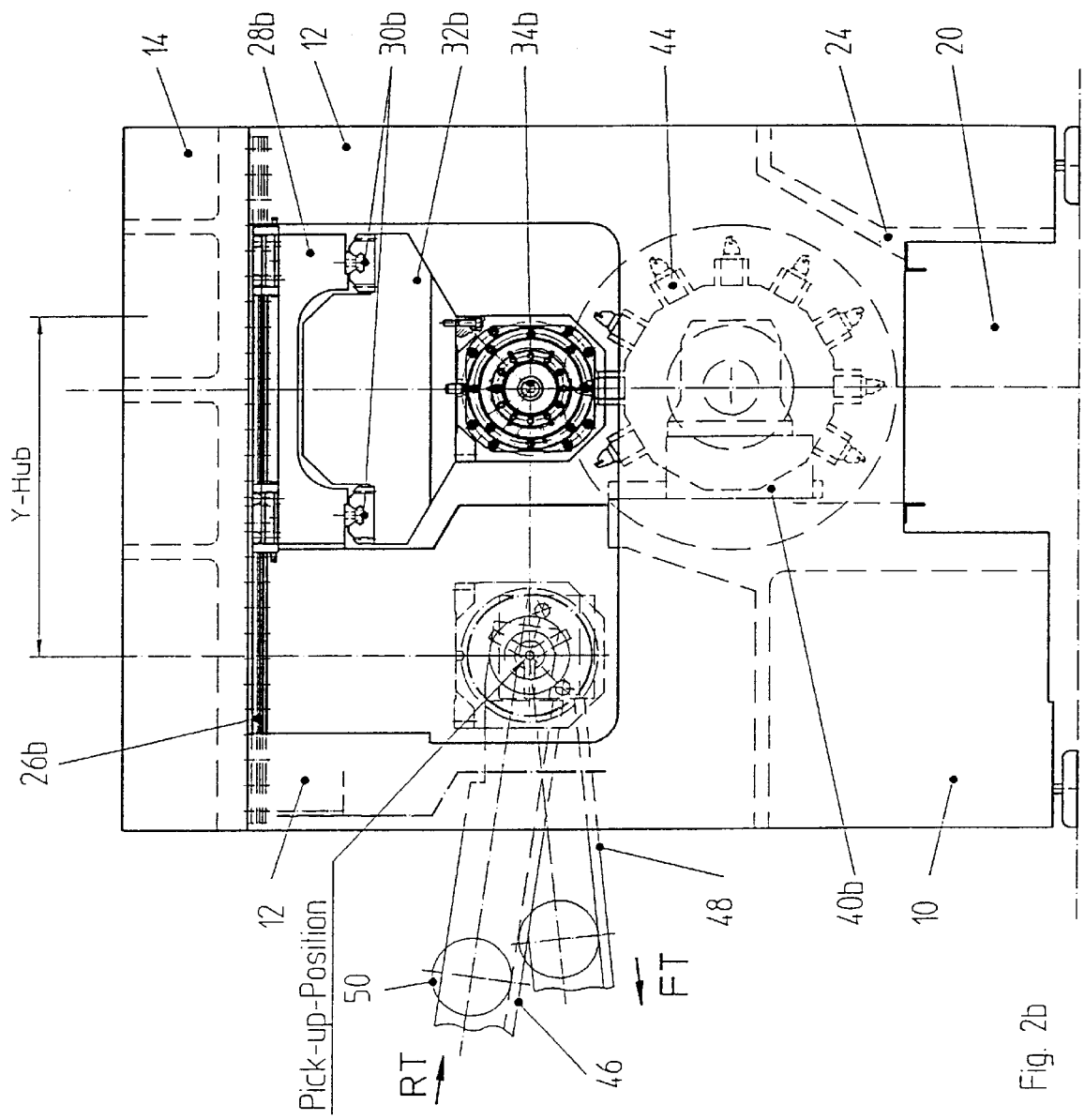
FIG. 2b shows the second embodiment of the machine tool in a side view.
Figure 2C:
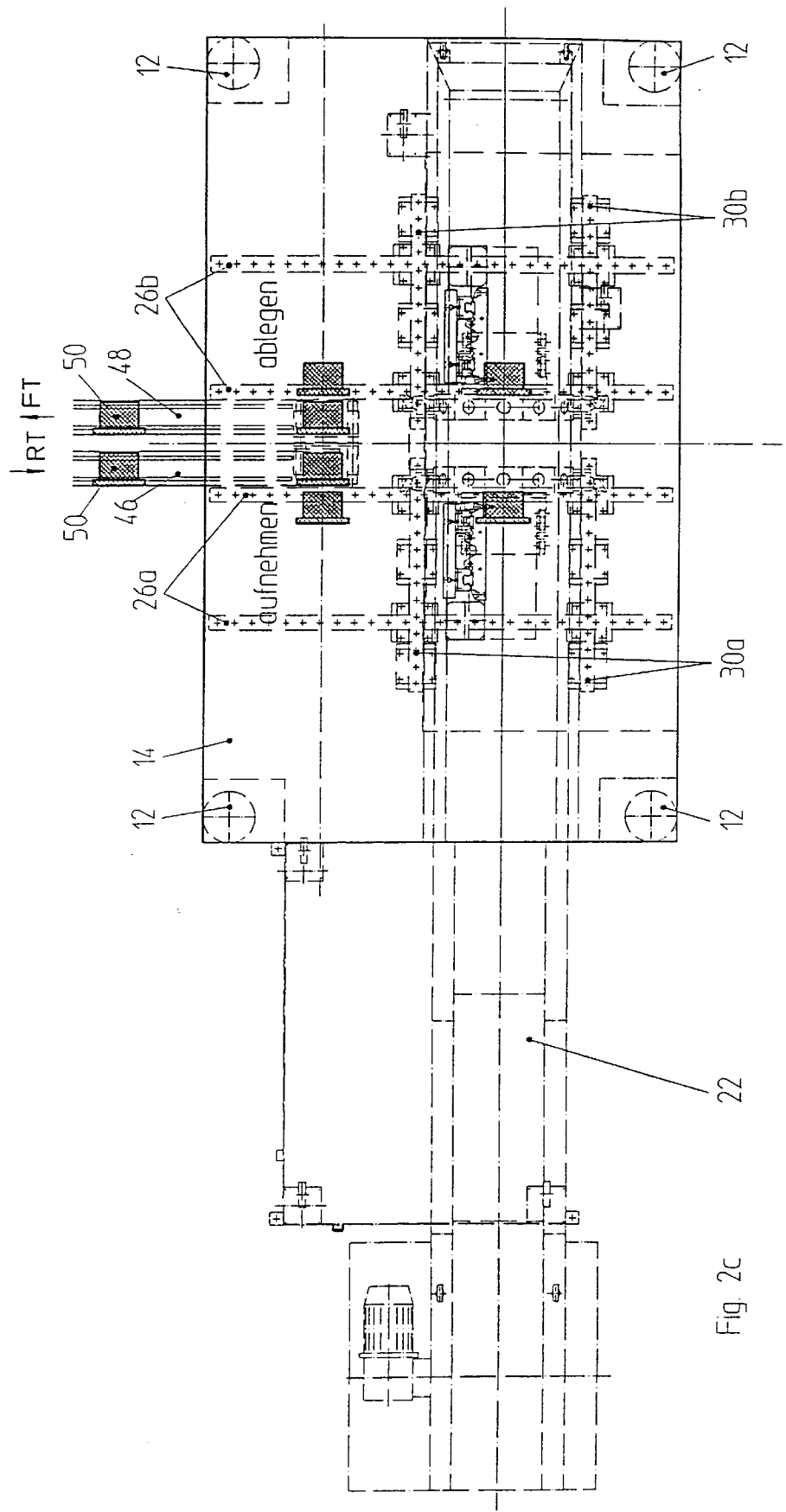
FIG. 2c shows the second embodiment of the machine tool in a top view.

In the embodiment of the machine tool according to FIG. 2, two Y-guides 26a and 26b are mounted on the underside of the upper section 14 of the base, said guides running parallel to one another and offset with respect to one another in the Z-direction. Each of the Y-guides 26a, 26b carries a Y-carriage 28a, 28b respectively. Z-carriages 32a and 32b with horizontal work spindles 32a and 34b are mounted on Y-carriages 28a and 28b. Two X-guides 38a and 38b each with an X-carriage 40a and 40b are located in the lower section 10 of the base, and support tool turret 44.

The machining position of work spindle 34a and of X-carriage 40a has associated with it a conveyor belt 46 of the loading and unloading station designed as a feed channel, while a conveyor belt 48 designed as a discharge channel is associated with the working position of the second work spindle 34b and X-carriage 40b.

The operation of the machine tool of the embodiment shown in FIG. 2 is as follows:

Workpiece blanks 50 are supplied by conveyor belt 46 and brought into the loading position in the machine base. Work spindle 34a is brought into the loading position by Y-carriage 28a and Z-carriage 32a so that workpiece 50 can be picked up and chucked in work spindle 34a. Work spindle 34a is then moved into the working position at tool turret 44 of X-carriage 40a. By driving work spindle 34a and with NC-control of the Z-travel of Z-carriage 32a and the X-travel of X-carriage 40a, workpiece 50 is machined from one end.

After this first turning is complete, work spindles 34a and 34b are aligned flush with one another and moved toward one another by means of Z-carriages 32a and 32b so that workpiece 50 can be transferred from the first chucking in work spindle 34a to the second chucking in work spindle 34b. The second turning of the second end of workpiece 50 is then performed with NC-control of Z-carriage 32b and X-carriage 40b. When the second turning is complete, the completely machined workpiece 50 is then brought into the unloading position by means of Z-carriage 32b and Y-carriage 28b and placed on conveyor belt 48 to be taken away.

Figure 3A:
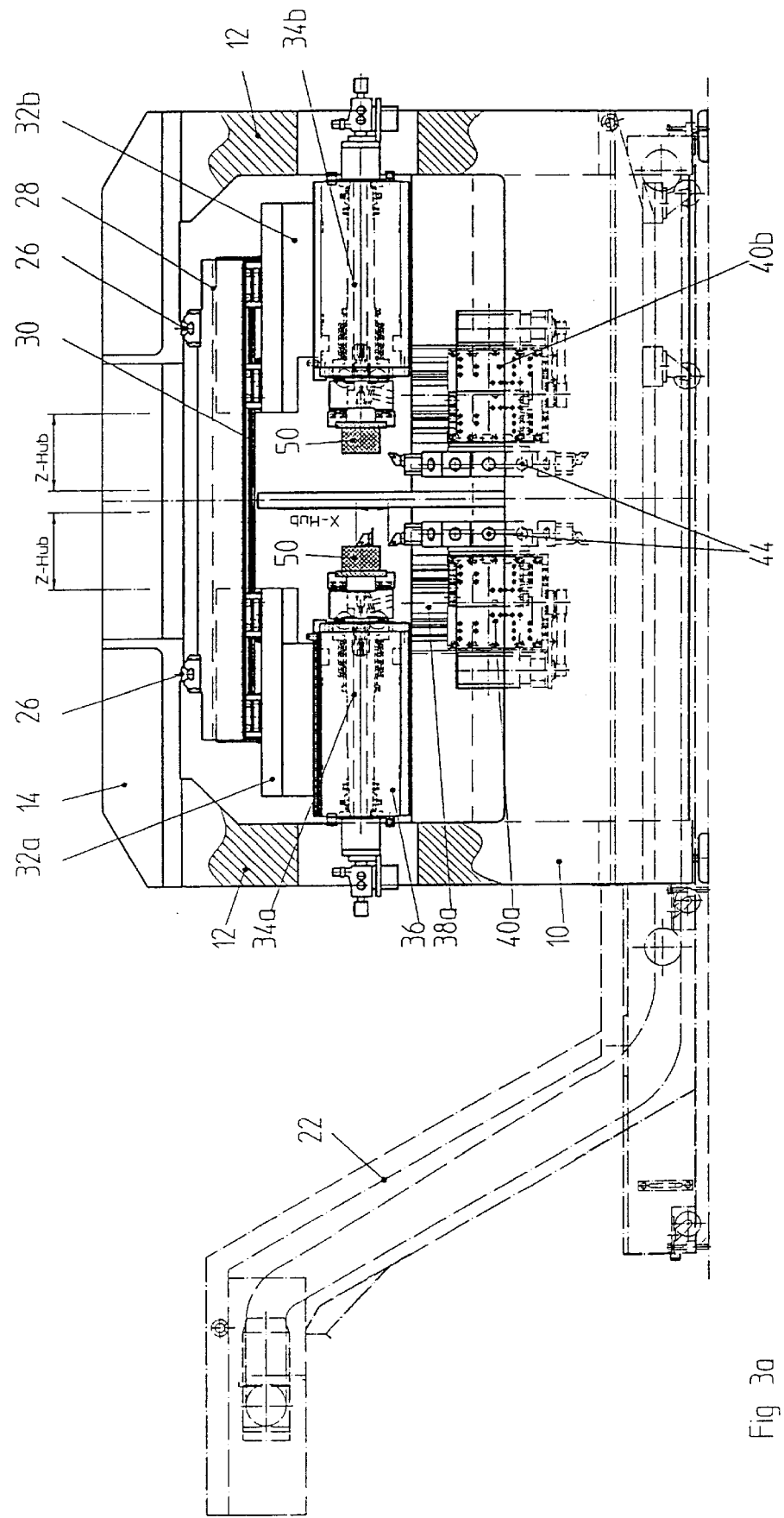
FIG. 3a shows a third embodiment of the machine tool in a front view.

FIGS. 3a, b, c show a third version that serves for parallel, preferably identical turning of two workpieces.

In this embodiment, the upper section 14 of this base has only one Y-guide with a Y-carriage 28. A Z-guide 30 is mounted on the underside of Y-carriage 28, but two Z-carriages 32a and 32b are suspended from guide 30. Each of Z-carriages 32a and 32b carries a work spindle, 34a and 34b respectively. Both work spindles 34a and 34b have an X-carriage 40a or 40b with a tool turret 44 associated with them. To supply and carry away workpieces 50, two conveyor belts 46a and 46b designed as feed channels lead into the loading and unloading station and two conveyor belts 48a and 48b designed as discharge channels carry away the completely machined workpieces. Conveyor belts 46a and 48a run parallel one above the other in a Z-position that corresponds to the machining position of work spindle 34a. Conveyor belts 46b and 48b run parallel one above the other in a Z-position that corresponds to the machining position of work spindle 34b. As can be seen from FIGS. 3b and 3c, conveyor belts 46a and 48a as well as conveyor belts 46b and 48b each have transfer positions that are staggered with respect to one another in the Y-direction.

Figure 3B:
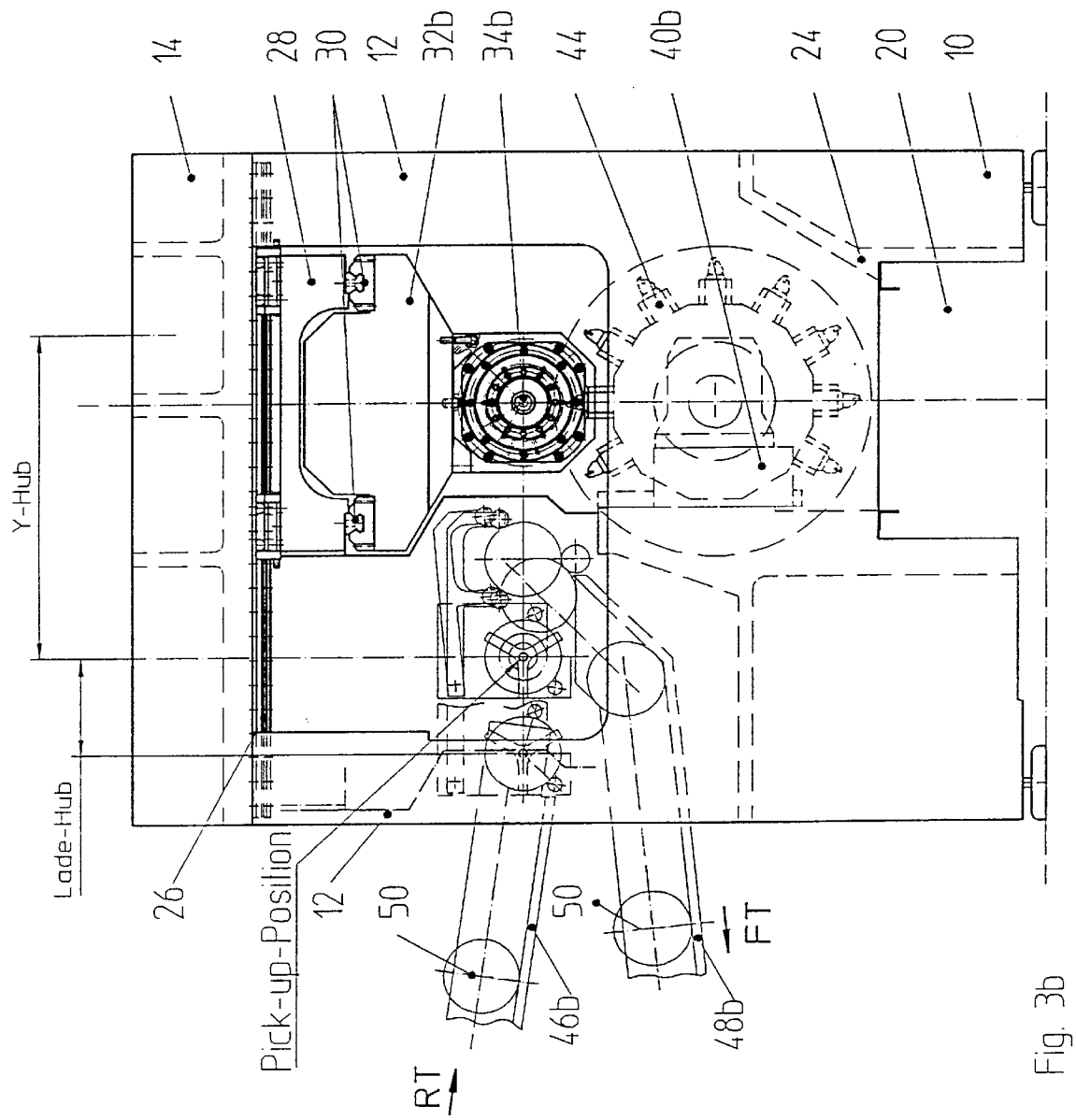
FIG. 3b shows the third embodiment of the machine tool in a side view.

The machine tool in FIG. 3 operates as follows:

Y-carriage 28 is moved in the Y-direction up to the transfer position of the supplying conveyor belt 46a or 46b that is marked with "loading travel" in FIG. 3b. In this position, the workpiece blanks 50 supplied by conveyor belts 46a and 46b are transferred and chucked in work spindles 34a and 34b. Then Y-carriage 28 is moved into the machining position. The workpieces 50 chucked in work spindles 34a and 34b are turned simultaneously, while the Z-carriages 32a and 32b and the X-carriages 40a and 40b are advanced under NC-control. When workpieces 50 have been completely machined, Y-carriage 28 is moved once again into the loading and unloading station so that machine spindles 34a and 34b together with workpieces 50 move past the transfer position of the respective discharge conveyor belts 48a and 48b so that the completely machined workpieces 50 can be laid down on these conveyor belts 48a and 48b.

Figure 4A:
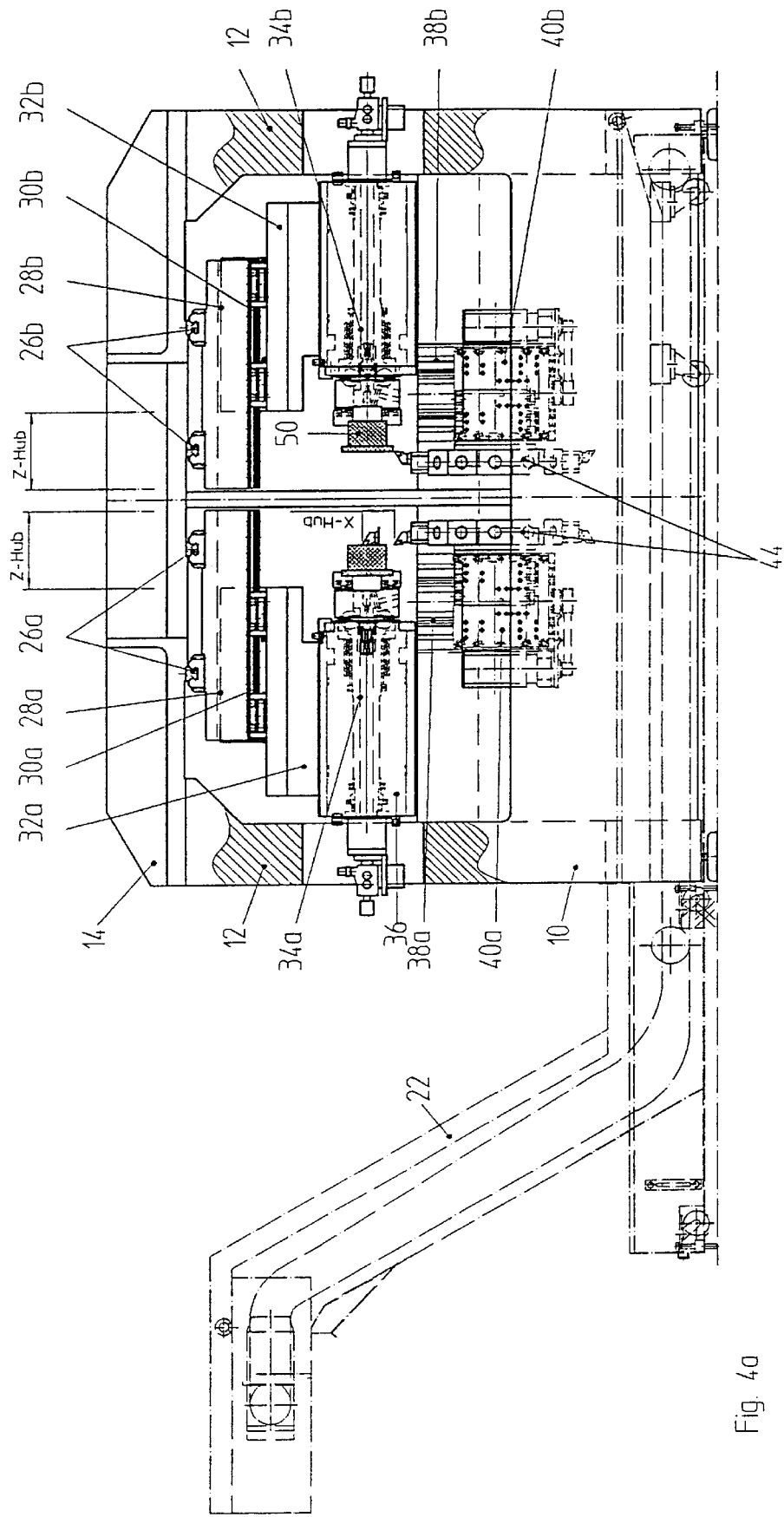
FIG. 4a shows a fourth embodiment of the machine tool in a front view.
Figure 4C:
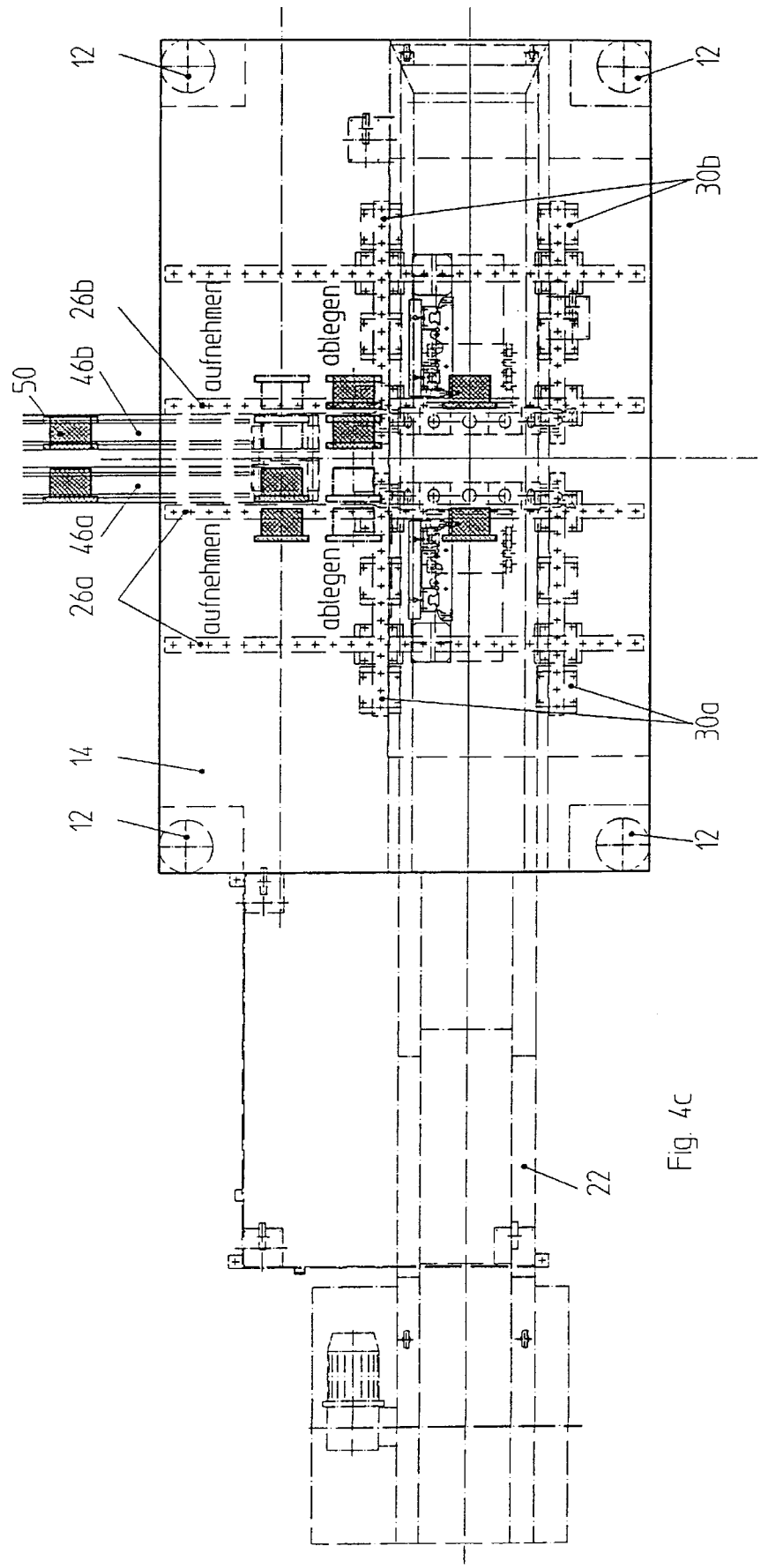
FIG. 4c shows the fourth embodiment of the machine tool in a top view.

FIGS. 4a, b, c shows a fourth version of the machine tool in which two flange-shaped workpieces can be machined in parallel in two chuckings.

In this embodiment, the machine tool has two Y-guides 26a and 26b on the upper section 14 of the base with Y-carriages 28a and 28b. Each of the Y-carriages 28a and 28b carries a Z-carriage 32a and 32b. Turning is performed by work spindles 34a and 34b as well as X-carriages 40a and 40b with respective tool turrets 44.

Conveyor belts 46a and 46b lead to the loading and unloading station, while conveyor belts 48a and 48b lead away from the loading and unloading station. Conveyor belts 46a, 46b, 48a, 48b correspond to the embodiment described in FIG. 1.

If workpieces are to be machined identically in parallel on both work spindles 34a and 34b, the machine tool operates in the same fashion as explained for the embodiment shown in FIG. 3. If workpieces are to be machined in two chuckings, the workpiece blanks are supplied by the supplying conveyor belt 46a and picked up by the first machine spindle 34a and machined in the first chucking. After the first machining in work spindle 34a, the workpieces are transferred to the second work spindle 34b, as described with reference to the embodiment in FIG. 2, and turned there in the second chucking. After the second turning is complete, work spindle 34b transfers the completely machined workpieces 50 to the conveyor belt 48b associated with the second work spindle 34b.

Figure 5A:
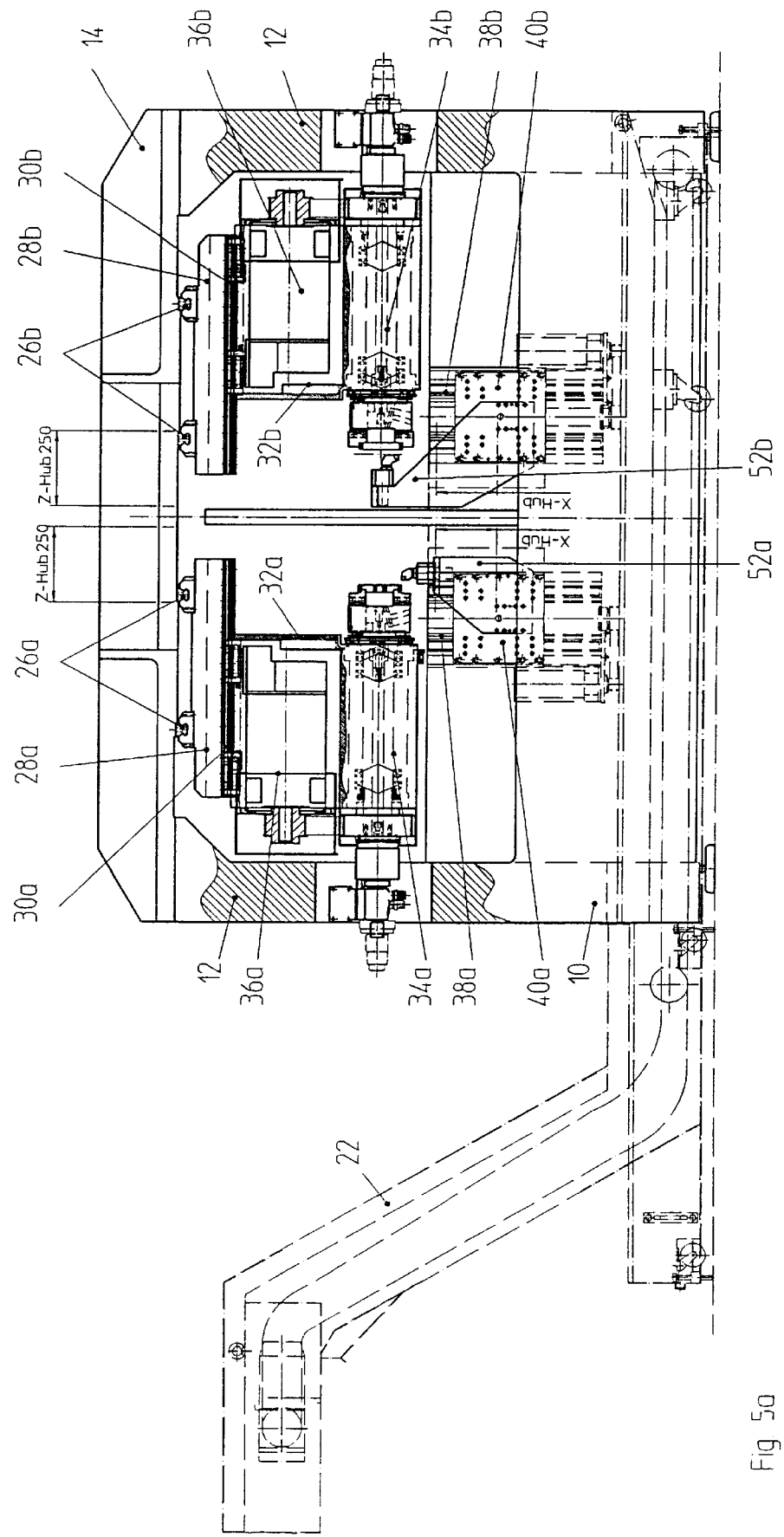
FIG. 5a shows a fifth embodiment of the machine tool in a front view.

In FIGS. 5a, b, c, another embodiment of the machine tool is shown in which four work spindles 34 are provided in order in particular to reduce nonproductive time. In the embodiment shown, the machining of flange-shaped workpieces 50 in two chuckings is shown.

Figure 5B:
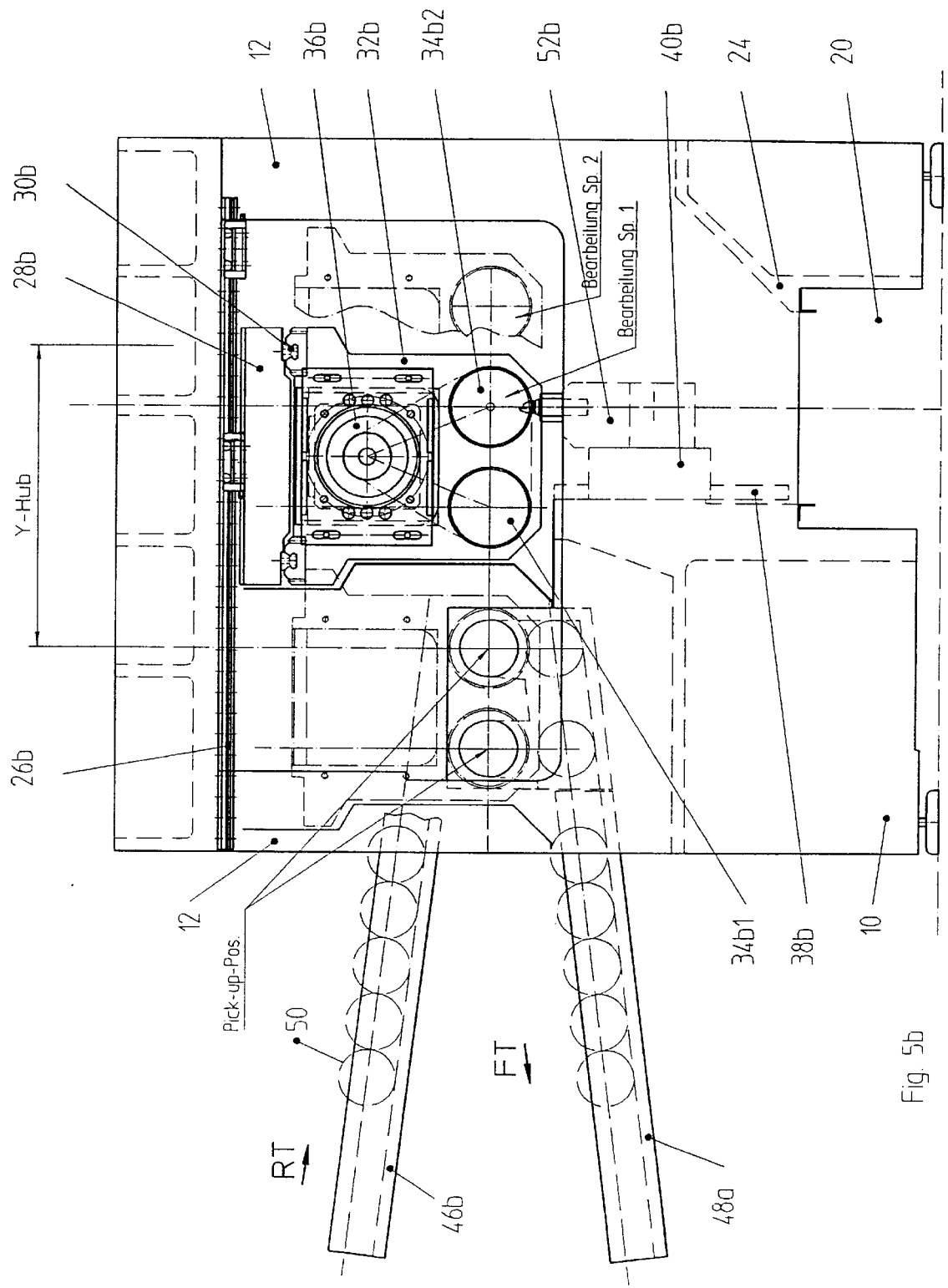
FIG. 5b shows the fifth embodiment of the machine tool in a side view.

In the version shown in FIG. 5, on the underside of upper section 14 of the base, two Y-guides 26a, 26b are provided with Y-carriages 28a, 28b. Below, Y-carriages 28a, 28b, Z-carriages 32a and 32b are guided suspended on Z-guides 30a and 30b. Z-carriages 32a and 32b each carry a drive motor 36a and 36b as well as two work spindles 34a1 and 34a2 and 34b1 and 34b2 that are located parallel to one another and can be switchably driven by the respective drive motors 36a and 36b. The two machinings are each associated with an X-carriage 40a or 40b, which in the example shown accepts a tool support block 52.

In correspondence with the arrangement of the two work spindles on each Z-carriage 32a, 32b, the loading and unloading station is equipped with a double transfer position. The workpiece blanks are supplied by a conveyor belt 46b designed as a feed channel and after machining they are carried away by a conveyor belt 48a designed as a discharge channel.

The machine tool shown in FIG. 5 works as follows:

The workpiece blanks are supplied by conveyor belt 46b, with two workpiece blanks at a time reaching the transfer position of the loading and unloading station. Z-carriage 32b is moved into the loading position Z-travel and Y-travel, where the, two workpiece blanks are chucked in work spindles 34b1 and 34b2. Then Z-carriage 32b is moved into the position shown by the solid lines in FIG. 5b, in which work spindle 34b2 is above the tool carrier block 52b of X-carriage 40b. Drive motor 36b drives work spindle 34b2 and workpiece 50 chucked in this work spindle is turned. After turning is complete, Y-carriage 28b is advanced so that the second work spindle 34b1 moves above workpiece support block 52b of X-carriage 40b. This position is represented by the dot-dashed lines in FIG. 5b. In this position, the second workpiece chucked in work spindle 34b1 is turned. Then Z-carriages 32a and 32b are moved so that they are flush and located axially opposite one another so that the two workpieces 50 can be transferred from work spindles 34b1 and 34b1 of Z-carriage 32b to work spindles 34a1 and 34a2 of Z-carriage 32a and chucked there in the second, opposite chucking. Correspondingly, the machining of the two workpieces is performed successively on work spindles 34a1 and 34a2 by tool carrier block 52a of X-carriage 48. If the turning of both workpieces ends with the second chucking, Z-carriage 32a moves into the unloading position and transfers the completely machined workpieces 50 to conveyor belt 48a to carry them away.

In this embodiment, Z-carriages 32a and 32b need to be moved into the loading and unloading position only once for each two workpieces 50, thus reducing nonproductive time.

Figure 6A:
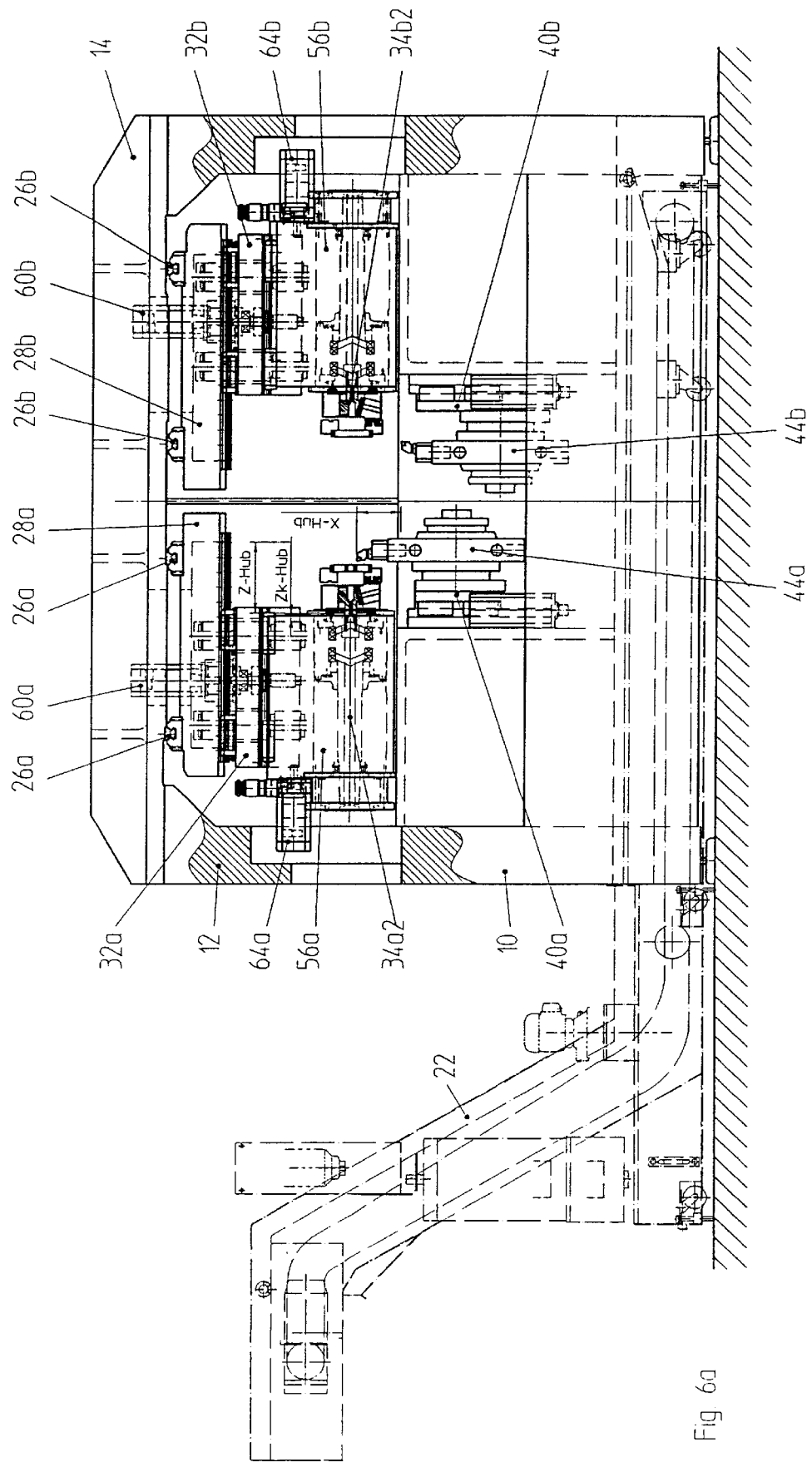
FIG. 6a shows a sixth embodiment of the machine tool in a front view.

FIGS. 6a, b, c show a sixth version of the machine tool with four work spindles, with two flange-shaped workpieces in each case being machined simultaneously and parallel in two chuckings.

On the underside of base upper section 14, two Y-guides 26a, 26b are provided with Y-carriages 28a, 28b. Below, on Y-carriages 28a, 28b, Z-carriages 32a, 32b are movably mounted on Z-guides 30a, 30b at right angles to Y-guides 26a, 26b. X-correction carriages 54a and 54b and Z-correction carriages 56a and 56b are located side by side on the undersides of Z-carriages 32a and 32b. First work spindles 34a1 or 34b1 are mounted in X-correction carriages 54a and 54b and second work spindles 34a2 and 34b2 are mounted in Z-correction carriages 56a and 56b. The two work spindles 34a1 and 34a2 and 34b1 and 34b2 are located axially parallel and horizontal in the Z-direction. The X-correction carriage 54a or 54b is guided movably vertically in the X-direction on Z-carriages 32a and 32b. For this purpose, X-correction guides 58a and 58b are provided, which are located vertically on Z-carriages 32a and 32b and guide X-correction carriages 54a and 54b. An X-correction drive 60a or 60b mounted on Z-carriages 32a and 32b serves to move X-correction carriage 54 in the vertical X-direction relative to Z-carriage 32a or 32b.

Z-correction carriages 56a or 56b are mounted horizontally in the Z-direction on Z-carriages 32a or 32b. For this purpose, Z-correction guides 62a and 62b are provided that are mounted on the undersides of Z-carriages 32a and 32b and guide Z-carriages 56a and 56b. A Z-correction drive 64a or 64b mounted on Z-carriage 32a or 32b serves to move Z-correction carriage 56a or 56b opposite Z-carriage 32a or 32b.

In the bottom part 10 of the base, a vertically movable X-carriage 40a or 40b is mounted relative to work spindles 34a1 and 34a2 or 34b1 and 34b2. X-carriage 40a or 40b carries a tool turret 44a or 44b with a horizontal axis of rotation. Tool turret 44a or 44b carries two machining tools in each switch position, said tools being located parallel to one another and side by side at a distance that corresponds to the spacing of work spindles 34a1 and 34a2 or 34b1 and 34b2. In the embodiment shown, tool turret 44a or 44b is designed to be essentially square and has four switch positions, with two tools being located on each side of tool turret 44a or 44b.

The machine tool in FIG. 6 operates as follows:

For machining flange-shaped workpieces, the tool blanks are fed to a transfer position of the loading and unloading station by a conveyor belt 46 in the form of a feed channel. In the transfer position (pick-up position), two blanks are positioned axially parallel side by side. Y-carriage 28b moves into the transfer position and picks up these two blanks which are chucked on work spindles 34b1 and 34b2 in a first chucking. Y-carriage 28b moves into the machining position in which the workpiece blanks are associated with tools of tool turret 44b. The turning of the workpieces then proceeds simultaneously and parallel on work spindles 34b1 and 34b2, using the tools in tool turret 44b. Machining takes place under NC-control, with the drive for Z-carriage 32b causing the Z-travel and the drive of X-carriage 40b producing the X-drive for turning. In order to compensate for different cutting properties of the tools that are used on work spindle 34a1 and those on work spindle 34a2, for example as the result of different tool wear, X-correction carriage 54b and Z-correction carriage 56b are provided. The Z-travel for turning on work spindle 34b1 is determined by Z-carriage 32b. For work spindle 34b2, this Z-travel of Z-carriage 32b can be additionally corrected by Z-correction carriage 56b under NC-control. The X-travel for turning is determined by X-carriage 40b for machining on work spindle 34b2. For turning on work spindle 34b 1, the latter can be corrected additionally by the X-correction carriage 54b under NC-control as a result of the X-travel provided by X-carriage 40b. In this manner, deviations in machining between the two work spindles 34b 1 and 34b2 can be corrected in the directions of both the Z-axis and the X-axis.

After the machining of the workpieces is complete, with chucking in work spindles 34b1 and 34b2, the workpieces are transferred to work spindles 34a1 and 34a2 and chucked there. In this second chucking, the workpieces are machined in corresponding fashion at their opposite axial ends. After machining and the second chucking is complete, the workpieces finished parts are moved by Y-carriage 28a into the delivery position in the loading and unloading station and are laid down there on the finished-part conveyor belt 48 designed as a discharge channel.

In this second version of the machine tool, two workpieces are machined during each matching cycle. As a result, the discharge rate of the finished parts is doubled while the machining cycle for each workpiece is cut in half. It is possible in this way to manufacture flange-like workpieces, for example races for roller bearings, with a cycle of 8 to 1 seconds per workpiece.

Figure 6B:
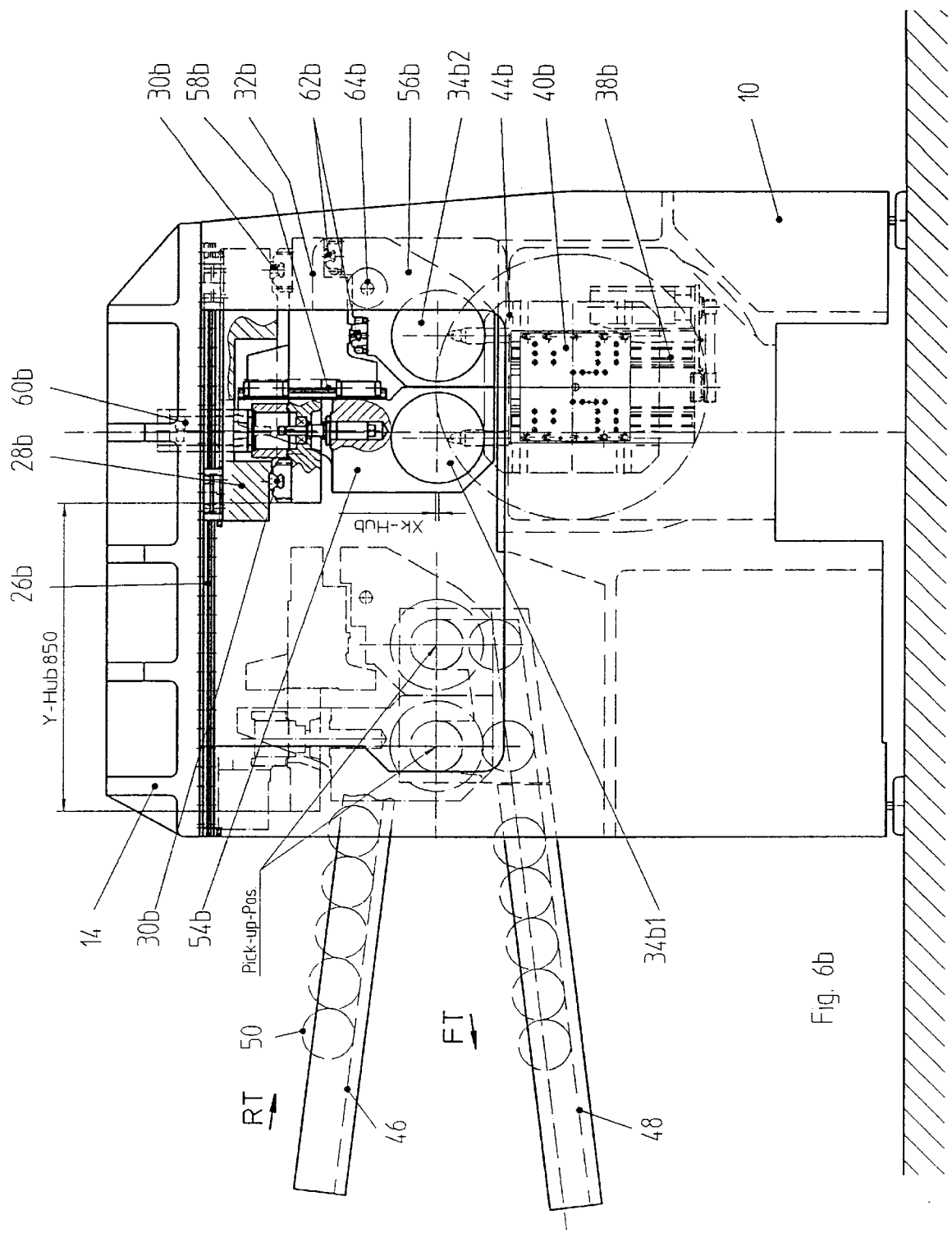
FIG. 6b shows the sixth embodiment of the machine tool in a side view.
Figure 6C:
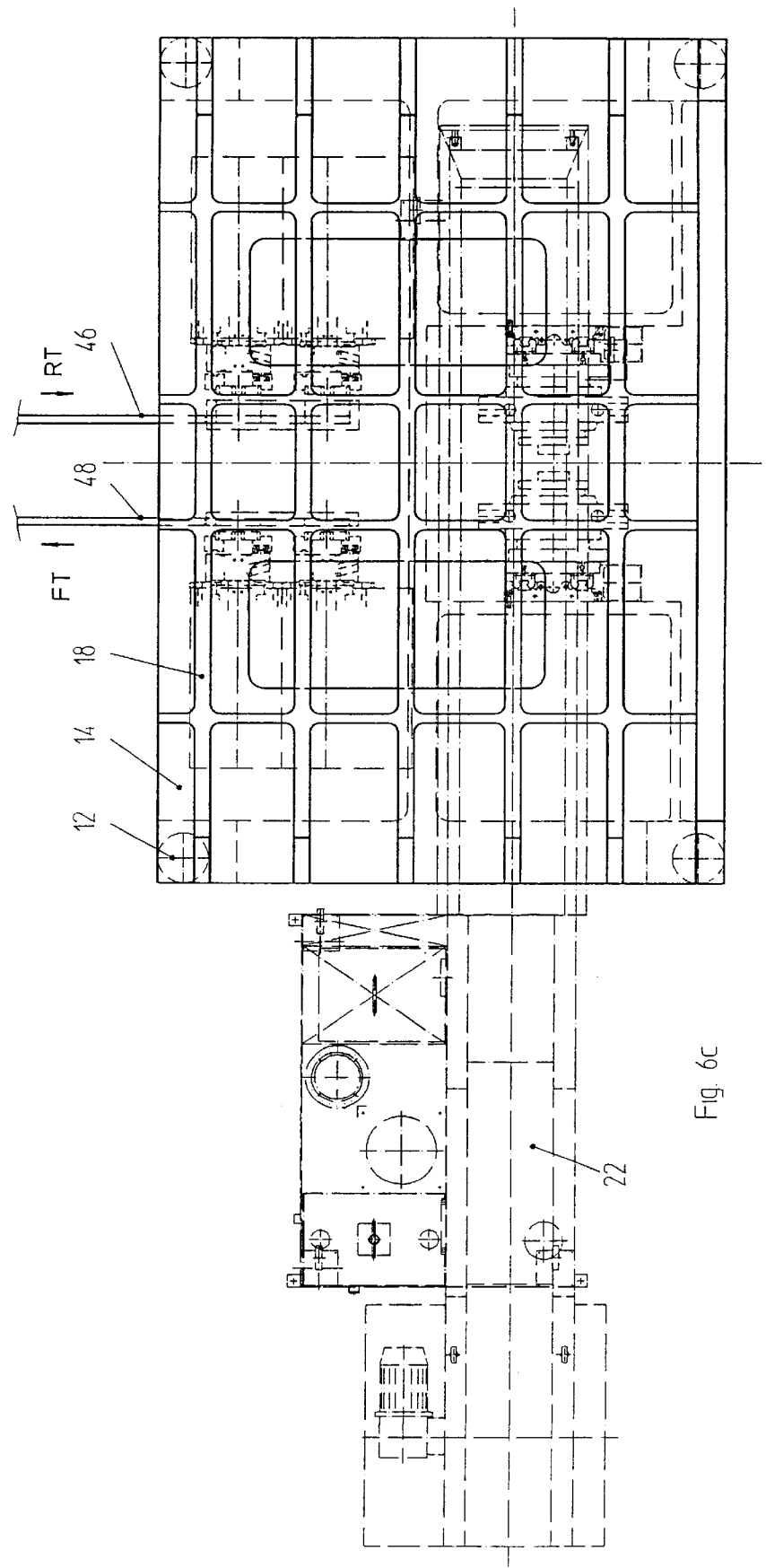
FIG. 6c shows the sixth embodiment of the machine tool in a top view.
Figure 7C:
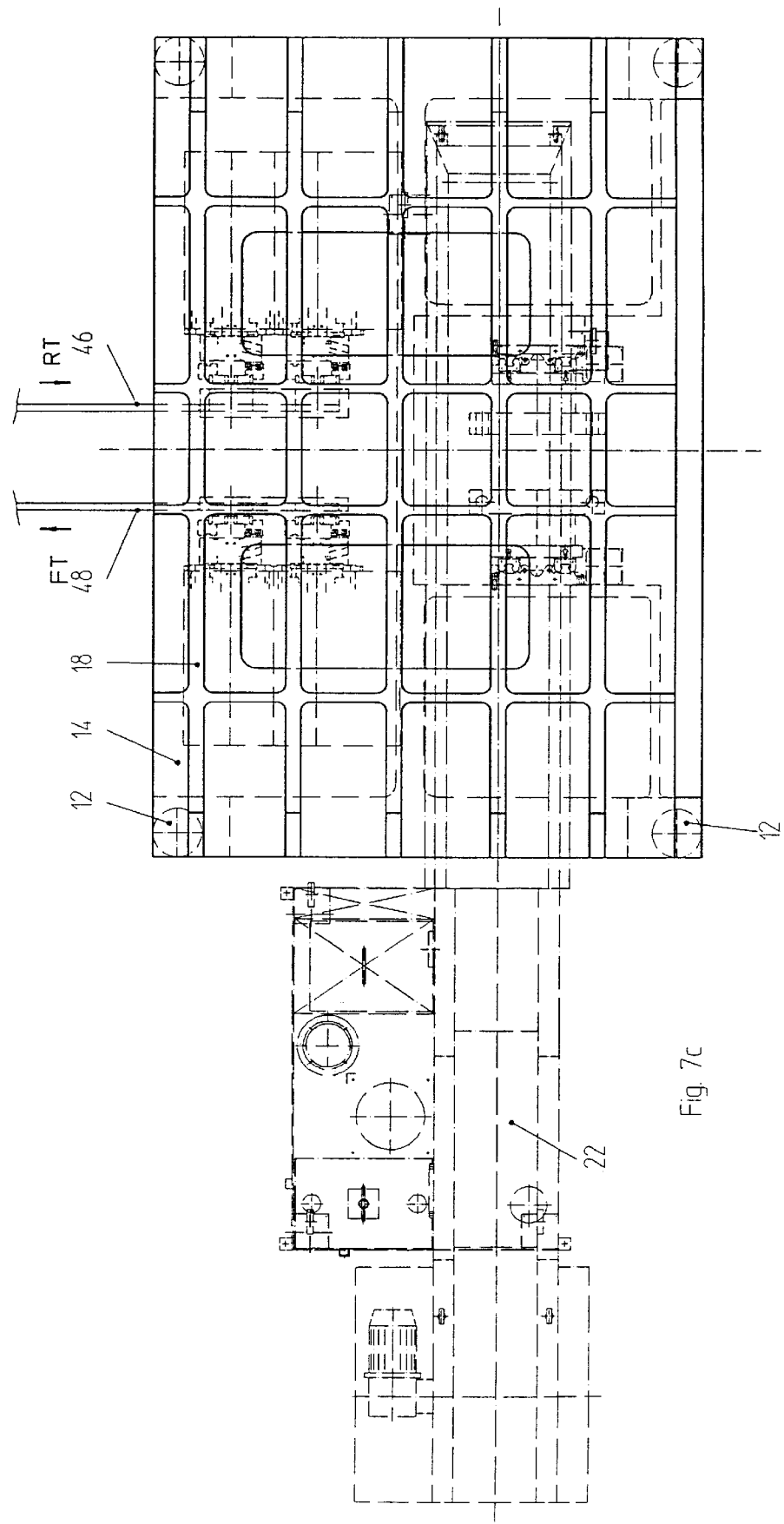
FIG. 7c shows the seventh embodiment of the machine tool in a top view.

FIGS. 7a, b, c show a modification of the machine tool in FIG. 6. The embodiment in FIG. 7 largely corresponds to the embodiment in FIG. 6. In contrast to the embodiment in FIG. 6, however, tool carrier blocks 52a and 52b are provided on X-carriages 40a and 40b instead of tool turrets 44a and 44b. Machining otherwise takes place in the same way as described for the embodiment in FIG. 6.

In the above embodiments the machine tools are each designed for turning. Accordingly, an NC-controlled feed is provided only for the X-axes and the Y-axes. The Y-travel, which takes place only between the machining position and the loading and unloading position, can be performed by a simple hydraulic drive between the end stops.

If complete machining of workpieces 50 is to be performed, the Y-feed can also be equipped with NC-control. Then non-rotationally symmetrical machining can also be performed.

Instead of work spindles 34 with workpiece chucking means for turning, work spindles 34 can also be designed as drill spindles or grinding spindles. In this case, the respectively associated X-carriages are designed for chucking workpieces. Additional possible combinations of known modules of machining machines will be obvious to the individual skilled in the art.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A machine tool for machining a workpiece comprising:
    a machine base;
    four base columns secured to the machine base;
    a horizontal upper section supported by the base columns;
    at least one Y-carriage suspended from an underside of the horizontal upper section and horizontally guided on the upper section in a Y-direction;
    at least one Z-carriage suspended from an underside of the at least one Y-carriage and guided horizontally on the at least one Y-carriage in a Z-direction;
    at least one work spindle extending horizontally and suspended from the at least one Z-carriage, said at least one work spindle adapted to hold the workpiece to be machined; and
    at least one vertically guided X-carriage arranged on a lower section of the machine base and adapted to carry a tool for machining the workpiece.

2. Machine tool according to claim 1, wherein the at least one Y-carriage is suspended from and guided by Y-guides and the at least one Z-carriage is suspended from and guided by Z-guides, with the Y-guides and the Z-guides comprising profiled rail guides and roller bearings capable of supporting suspended loads.

3. Machine tool according to claim 1, wherein the Z-direction is perpendicular to the Y-direction.

4. Machine tool according to claim 1, wherein the machine base defines a base area and the horizontal upper section substantially covers the base area.

5. Machine tool according to claim 1, wherein the horizontal upper section is made in the shape of a horizontal plate with reinforcing ribs formed on an upper side of the plate and wherein the horizontal plate is attached to the base columns.

6. Machine tool according to claim 5, wherein the horizontal plate is attached to the base columns with bolts.

7. Machine tool according to claim 1, wherein an operating side for operating the machine is arranged on the machine base opposite to a loading and unloading side.

8. Machine tool according to claim 7, further comprising at least one supply line for driving the at least one X-, Y- and Z-carriages and at least one drive motor for driving the at least one work spindle, wherein the at least one supply line and the at least one drive motor are arranged on sides of the machine base that are perpendicular to the operating side.

9. Machine tool according to claim 1, further comprising at least one conveyor belt for supplying the workpiece to and removing the workpiece from a respective loading and unloading station located within the machine base, wherein the at least one Y-carriage can move between the respective loading and unloading station and a workspace to transfer the workpiece to the loading station and to remove the workpiece from the unloading station.

10. Machine tool according to claim 1, wherein the workpiece is machined by moving the at least one Z-carriage and the at least one X-carriage under NC-control and by moving the at least one Y-carriage by fluid pressure between a machining position and end positions corresponding to respective loading and unloading positions.

11. Machine tool according to claim 1, wherein the workpiece is fully machined by moving the at least one Z-carriage, the at least one Y-carriage, and the at least one X-carriage under NC-control.

12. Machine tool according to claim 1, the at least one Z-carriage further comprising a tailstock located opposite to and axially aligned with the work spindle for machining the workpiece in a cylindrical shape.

13. Machine tool according to claim 1, the at least one work spindle further comprising workpiece chucking means.

14. Machine tool according to claim 1, comprising two Z-carriages, each Z-carriage having at least one work spindle defining a respective spindle axis, each work spindle including a respective workpiece chucking means, wherein the respective spindle axes are aligned parallel to each other and the respective chucking means face each other, and wherein each Z-carriage is associated with a respective X-carriage.

15. Machine tool according to claim 14, wherein the two Z-carriages are guided on a common Y-carriage.

16. Machine tool according to claim 14, wherein each of the two Z-carriages is guided on a separate Y-carriage, with the respective Y-carriages being guided parallel to and spaced apart from each other.

17. Machine tool according to claim 1, wherein at least one Z-carriage comprises at least two work spindles arranged side by side and having parallel axes, wherein a single X-carriage carrying a plurality of tools is associated with the at least two work spindles, with the number of tools that can be used simultaneously corresponding to the number of work spindles, and wherein the relative travel between the work spindles and the tools in at least one of the Z-direction and the X-direction can be controllably adjusted.

18. Machine tool according to claim 17, a wherein each of the work spindles is attached to a separate correction carriage, with the correction carriages secured to the Z-carriage and guided in at least one of the X-direction and the Z-direction.

19. Machine tool according to claim 18, wherein two work spindles are mounted on at least one Z-carriage, with one work spindle supported by an X-correction carriage that is guided in vertical X-correction guides arranged on the Z-carriage, and with the other work spindle supported by a Z-correction carriage that is guided in horizontal Z-correction guides arranged on the Z-carriage.

20. Machine tool according to claim 1, wherein the at least one X-carriage comprises at least one tool turret.

* * * * *